(12) United States Patent
Nakamura et al.

(10) Patent No.: US 8,455,593 B2
(45) Date of Patent: Jun. 4, 2013

(54) POLYORGANOSILOXANE COMPOSITION AND CURED PRODUCTION THEREOF

(75) Inventors: Shuhei Nakamura, Tsu (JP); Hiroaki Cho, Tsu (JP); Yasunori Ashida, Tsu (JP); Yasushi Murakami, Ueda (JP); Wataru Shimizu, Ueda (JP)

(73) Assignees: Mie University (JP); Shinshu University (JP)

( * ) Notice: Subject to any disclaimer, the term of this patent is extended or adjusted under 35 U.S.C. 154(b) by 292 days.

(21) Appl. No.: 13/124,492

(22) PCT Filed: Oct. 22, 2009

(86) PCT No.: PCT/JP2009/005533
§ 371 (c)(1),
(2), (4) Date: Apr. 15, 2011

(87) PCT Pub. No.: WO2010/047109
PCT Pub. Date: Apr. 29, 2010

(65) Prior Publication Data
US 2011/0207864 A1    Aug. 25, 2011

(30) Foreign Application Priority Data
Oct. 23, 2008  (JP) .................................. 2008-273370

(51) Int. Cl.
C08F 283/00 (2006.01)
C07C 67/08 (2006.01)
C08G 18/42 (2006.01)

(52) U.S. Cl.
USPC ............................ 525/474; 524/310; 524/361

(58) Field of Classification Search
USPC .................... 525/474; 524/310, 361
See application file for complete search history.

(56) References Cited

U.S. PATENT DOCUMENTS 6,361,716 B1 *  3/2002  Kleyer et al. ................. 252/514

FOREIGN PATENT DOCUMENTS

| JP | 9-118827 | 5/1997 |
|---|---|---|
| JP | 2000-109560 | 4/2000 |
| JP | 2000-265062 | 9/2000 |
| JP | 2002-348380 | 12/2002 |
| JP | 2006-336010 | 12/2006 |
| JP | 2006-348284 | 12/2006 |
| JP | 2006336010 A * | 12/2006 |
| JP | 2008-120054 | 5/2011 |

OTHER PUBLICATIONS

18th Fall Meeting of The Ceramic Society of Japan, 2005, p. 272.

* cited by examiner

*Primary Examiner* — Randy Gulakowski
*Assistant Examiner* — Christopher M Rodd
(74) *Attorney, Agent, or Firm* — Cowan, Liebowitz & Latman, P.C.; Mark Montague, Esq.

(57) ABSTRACT

Disclosed are: a polyorganosiloxane composition which can be cured into a product having high strength and has little influence on the environment; and a cured product of the polyorganosiloxane composition. Specifically disclosed are: a polyorganosiloxane composition comprising (A) a polyorganosiloxane in which at least one end in the molecule is modified with a silanol, (B) a titanium alkoxide in an amount of 0.01 to 2 moles relative to 1 mole of the polyorganosiloxane, and (C) an α-hydroxycarbonyl compound or a hydroxycarboxylic acid ester in an amount of 0.01 to 2 moles relative to 1 mole of the polyorganosiloxane; and a cured product of the polyorganosiloxane composition.

19 Claims, 28 Drawing Sheets

POLYORGANOSILOXANE COMPOSITION AND CURED PRODUCTION THEREOF

REFERENCE TO RELATED APPLICATION

The present application claims priority to Japanese Patent Application No. 2008-273370, filed Oct. 23, 2008, the disclosure of which is incorporated herein by reference.

TECHNICAL FIELD

The present invention relates to a polyorganosiloxane composition and a cured product thereof.

BACKGROUND ART

Polyorganosiloxane composition has conventionally exhibited excellent weather resistance and durability when cured, and has therefore been used in adhesives or sealing materials. In recent years, there is a tendency that higher strength is required of the cured products of polyorganosiloxane compositions. As a polyorganosiloxane composition to cope with this demand, for example, there is known a composition in which a filler material formed of an inorganic or organic compound is incorporated (see Patent Document 1).

Furthermore, the variety of materials on which adhesion is provided also tends to broaden, and as a polyorganosiloxane composition that is capable of satisfactory adhesion even to polybutylene terephthalate, high impact polystyrene, acrylic resin and the like, to which adhesion has been difficult, there is known a composition formed from a polyorganosiloxane, a silane compound having two or more hydrolyzable groups bonded to a silicon atom, and an additional reaction product of a vinyl group-containing bisphenol A and a silicone compound having an organo-oxy group (see Patent Document 2).

CITATION LIST

Patent Documents

Patent Document 1: Japanese Patent Application Laid-Open No. H9-118827 (claims)
Patent Document 2: Japanese Patent Application Laid-Open No. 2000-265062 (claims)

SUMMARY OF THE INVENTION

Problem to be Solved by the Invention

However, cured products of the conventional polyorganosiloxane compositions described above have problems such as follows. The polyorganosiloxane composition disclosed in Patent Document 1 requires a process of mixing a filler material during the production. Furthermore, in order to uniformly disperse the filler material in the cured product, the filler material must be subjected to a surface treatment, or in order to realize high strength, microparticles that are finer and have a narrow particle size distribution must be used. Thus, it is difficult to obtain cured products of high strength.

Furthermore, the polyorganosiloxane composition disclosed in Patent Document 2 uses a compound having a bisphenol A skeleton, which is known as one kind of environmental hormones, and accordingly, there is a high possibility that the polyorganosiloxane composition may lead to environmental pollution.

The present invention has been made in view of such problems, and it is an object of the invention to provide a polyorganosiloxane composition which can give a cured product of high strength and has less impact on the environment, and a cured product of the polyorganosiloxane composition.

Means for Solving the Problems

In order to achieve the object described above, the inventors of the present invention conducted a thorough investigation, and as a result, they succeeded in producing a polyorganosiloxane composition which gives a cured product of higher strength by mixing a titanium alkoxide, and an α-hydroxycarbonyl compound or a hydroxycarboxylic acid ester with the polyorganosiloxane without any filler material added therein, and from which risky materials having adverse effects on the environment have been reduced as much as possible, and a cured product of the polyorganosiloxane composition.

Specifically, according to the present invention, there is provided a polyorganosiloxane composition comprising:

(A) a polyorganosiloxane in which at least one end in a molecule is modified with a silanol;

(B) a titanium alkoxide in an amount of 0.01 to 2 moles relative to 1 mole of the polyorganosiloxane; and (C) an α-hydroxycarbonyl compound in an amount of 0.01 to 2 moles or a hydroxycarboxylic acid ester in an amount of 0.01 to 2 moles, relative to 1 mole of the polyorganosiloxane.

According to the present invention, there is provided a polyorganosiloxane composition in which the hydroxycarboxylic acid ester in an amount of 0.01 to 2 moles is particularly a malic acid ester in an amount of 0.01 to 0.4 moles.

According to the present invention, there is provided a polyorganosiloxane composition in which the hydroxycarboxylic acid ester is a malic acid ester, a lactic acid ester, or a tartaric acid ester.

According to the present invention, there is provided a polyorganosiloxane composition in which the α-hydroxycarbonyl compound is hydroxyacetone.

According to the present invention, there is provided a polyorganosiloxane composition in which the titanium alkoxide is particularly titanium tetraethoxide, titanium tetraisopropoxide, or titanium tetrabutoxide.

According to the present invention, there is provided a polyorganosiloxane composition which contains the polyorganosiloxane, titanium alkoxide and α-hydroxycarbonyl compound at a molar ratio of 1:1:0.5, and has a weight average molecular weight (Mw) of 8000 or more.

According to the present invention, there is provided a polyorganosiloxane composition in which the titanium alkoxide is particularly titanium tetraethoxide, titanium tetraisopropoxide, or titanium tetrabutoxide.

According to the present invention, there is provided a polyorganosiloxane composition which contains the polyorganosiloxane, the titanium alkoxide and the hydroxycarboxylic acid ester at a molar ratio of 1:1:0.1, and has a weight average molecular weight (Mw) of 5000 or more.

According to the present invention, there is provided a polyorganosiloxane composition in which the titanium alkoxide is titanium tetraethoxide.

According to the present invention, there is provided a polyorganosiloxane composition which contains the polyorganosiloxane, the titanium alkoxide and the hydroxycarboxylic acid ester at a molar ratio of 1:0.05:0.05.

According to the present invention, there is provided a polyorganosiloxane composition in which the hydroxycarboxylic acid ester is particularly a malic acid ester, a lactic acid ester, or a tartaric acid ester.

According to the present invention, there is provided a product obtained by curing any one of the polyorganosiloxane compositions described above.

Effect of the Invention

According to the present invention, a cured product having high strength can be obtained, and also, a polyorganosiloxane composition having a reduced environmental impact, and a cured product thereof can be obtained.

EMBODIMENT

Figure 1:
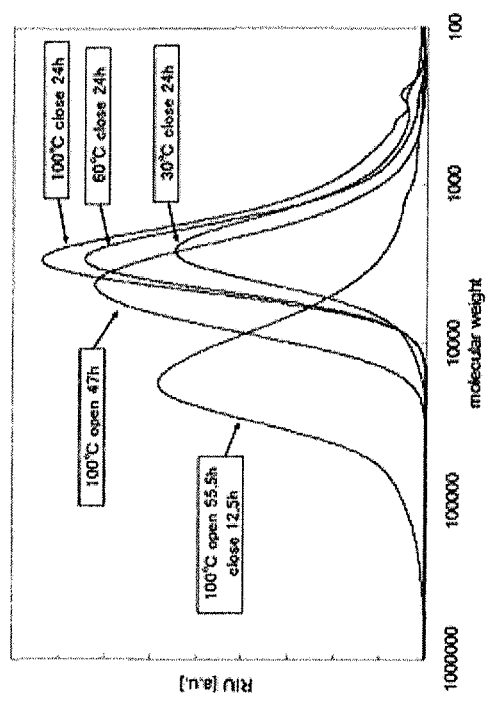
FIG. 1 shows changes in molecular weight distribution along with the passage of stirring period.

Hereinafter, preferable embodiments of the polyorganosiloxane composition and a cured product thereof will be explained.

The polyorganosiloxane composition according to one embodiment comprises:

(A) a polyorganosiloxane in which at least one end in the molecule is modified with a silanol (silanol-terminated polyorganosiloxane);

(B) a titanium alkoxide in an amount of 0.01 to 2 moles relative to 1 mole of the polyorganosiloxane; and (C) an α-hydroxycarbonyl compound in an amount of 0.01 to 2 moles, or a hydroxycarboxylic acid ester in an amount of 0.01 to 2 moles, relative to 1 mole of the polyorganosiloxane. Here, the term "composition" means an object in a state prior to curing, such as a solution or a gel-like material. The components (A), (B) and (C) will be explained in the following.

(1. Silanol-Terminated Polyorganosiloxane)

The silanol-terminated polyorganosiloxane that can be used in this embodiment is represented by the following formula (1). In this formula, $R^1$ and $R^2$ each independently represent a linear or branched alkyl group having 1 to 20 carbon atoms, a cycloalkyl group having 4 to 10 carbon atoms, or an aryl group or aryl-substituted hydrocarbon group having 6 to 10 carbon atoms. Preferable examples of the linear or branched alkyl group having 1 to 20 carbon atoms include various functional groups such as methyl, ethyl, n-propyl, i-propyl, n-butyl, i-butyl, s-butyl, t-butyl, pentyl, neopentyl, hexyl, heptyl, octyl, nonyl, decyl, undecyl, and dodecyl groups. Furthermore, preferable examples of the cycloalkyl group having 4 to 10 carbon atoms include various functional groups such as cyclopentyl and cyclohexyl. Preferable examples of the aryl group or aryl-substituted hydrocarbon group having 6 to 10 carbon atoms include various functional groups such as phenyl, toluyl, xylyl, ethylphenyl, benzyl, and phenethyl. A particularly preferred example of the silanol-terminated polyorganosiloxane is a polydimethylsiloxane modified with a silanol at both ends.

[Chemical Formula 1]

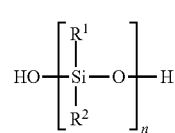

The viscosity of the silanol-terminated polyorganosiloxane at 23° C. is 10 to 100,000 mPa·s, preferably 20 to 50,000 mPa·s, and more preferably 30 to 10,000 mPa·s.

(2. Titanium Alkoxide)

Examples of the titanium alkoxide include titanium tetraethoxide, titanium tetrapropoxide, titanium tetraisopropoxide, titanium tetrabutoxide, titanium tetraisobutoxide, and titanium tetraisopropenyl oxide. Furthermore, oligomers of these compounds can also be available. Particularly preferred examples of the titanium alkoxide include titanium tetraethoxide, titanium tetraisopropoxide and titanium tetrabutoxide.

It is preferable that the titanium alkoxide be contained in the composition at a proportion in the range of 0.01 to 2 moles relative to 1 mole of the polyorganosiloxane. If the amount of the titanium alkoxide is too small, curing occurs with difficulties, and if the amount of the titanium alkoxide is too large, the cured product is hardened, and is prone to lose elasticity. It is more preferable that the titanium alkoxide be present in an amount equimolar to that of the polyorganosiloxane.

(3. α-Hydroxycarbonyl Compound or Hydroxycarboxylic Acid Ester)

Examples of the α-hydroxycarbonyl compound include hydroxyacetone, 2-hydroxy-2-methyl-3-butanone (acetoin), 3-hydroxy-3-methyl-2-butanone, and 2-hydroxy-1,2-diphenylethanone (benzoin). The hydroxycarboxylic acid ester is a product of an esterification reaction between a hydroxycarboxylic acid having 3 to 6 carbon atoms and an alcohol having 1 to 20 carbon atoms. Examples of the hydroxycarboxylic acid include monocarboxylic acids such as lactic acid and glyceric acid; dicarboxylic acids such as malic acid and tartaric acid; and tricarboxylic acids such as citric acid. Examples of the alcohol include saturated aliphatic alcohols such as methyl alcohol, ethyl alcohol, n-propyl alcohol, i-propyl alcohol, n-butyl alcohol, i-butyl alcohol, tert-butyl alcohol, pentyl alcohol, hexyl alcohol, heptyl alcohol, octyl alcohol, nonyl alcohol, decyl alcohol, lauryl alcohol, myristyl alcohol, palmityl alcohol, and stearyl alcohol.

The α-hydroxycarbonyl compound is particularly preferably hydroxyacetone. The hydroxyacetone has a structure in which one $CH_3$ of acetone is substituted with $CH_2OH$. Examples of the hydroxycarboxylic acid ester include a malic acid ester, a lactic acid ester, a tartaric acid ester, a citric acid ester, a glycol monoester, a glycerin monoester, a glycerin diester, and a ricinolic acid ester. Particularly, a malic acid ester, a lactic acid ester, and a tartaric acid ester are preferred, and among them, a malic acid ester is more preferred. The malic acid ester is particularly preferably a malic acid dialkyl ester. Examples of the malic acid dialkyl ester include malic acid dimethyl ester, malic acid diethyl ester, malic acid dipropyl ester, malic acid dibutyl ester, malic acid dihexyl ester, acetylmalic acid dioctyl ester, and malic acid monoethyl monooctyl ester. Among them, malic acid diethyl ester and malic acid dibutyl ester are particularly preferred.

The α-hydroxycarbonyl compound or hydroxycarboxylic acid ester is preferably contained in the composition in an amount in the range of 0.01 to 2 moles, particularly preferably contained in the composition in an amount in the range of 0.01 to 0.4 moles, and even more preferably contained in the composition in an amount in the range of 0.02 to 0.1 moles, relative to 1 mole of the silanol-terminated polyorganosiloxane.

Next, preferable characteristics of a polyorganosiloxane composition containing a polyorganosiloxane, a titanium alkoxide, and a malic acid ester which is an example of the α-hydroxycarbonyl compound or hydroxycarboxylic acid ester, will be described.

Generally, when there are $N_i$ molecules having a molecular weight of $M_i$, Mw means the average value of the molecular weight based on mass fraction ((sum of $M_i^2 \cdot N_i$)/(sum of $M_i \cdot N_i$)), and Mn means a value obtained by dividing the total mass by the number of molecules ((sum of $M_i \cdot N_i$)/(sum of $N_i$)). The term Mw/Mn is referred to as the molecular weight distribution index, and is a value which is a measure of describing the broadening of the molecular weight distribution.

The molecular weight distribution index (Mw/Mn) can be varied in a manner dependent on the temperature of the polyorganosiloxane composition and/or the time for maintaining the composition at that temperature. As the temperature increases, or the time for maintaining the composition at a certain temperature increases, the value of Mw/Mn tends to increase.

Next, the method for preparing the polyorganosiloxane composition will be described.

A silanol-terminated polyorganosiloxane, a titanium alkoxide, and an α-hydroxycarbonyl compound or a hydroxycarboxylic acid ester are introduced into a vessel at a predetermined molar ratio, and the mixture is stirred at a predetermined temperature in the range of 30 to 120° C. The atmosphere for the stirring process can be selected to be any of a closed atmosphere and an open atmosphere. Furthermore, when stirring is performed in an open atmosphere, it is preferable to perform the stirring while blowing nitrogen gas, argon gas or the like into the vessel. By regulating the temperature and the stirring time, and analyzing both the Mw and Mn values of a sample collected in the middle of stirring, a polyorganosiloxane composition having desired Mw, Mn and Mw/Mn values can be prepared.

EXAMPLES

1. Experiment for Regulation of Mw and Mn
(1) Evaluation of Solution Prepared by Using Hydroxyacetone In a glove box through which dry nitrogen gas flowed in and out, 40 g of a silanol-terminated polydimethylsiloxane (PDMS, X-21-5841 manufactured by Shin-Etsu Chemical Co., Ltd.; hereinafter, simply referred to as PDMS), having a viscosity of 34 mPa·s at 30° C., 13.612 g of titanium tetra-n-butoxide (TTnB, manufactured by Kanto Chemical Co., Inc.), and 1.482 g of hydroxyacetone (HA, manufactured by Wako Pure Chemical Industries, Ltd.) were introduced in this order, into a glass container with lids (separable flask having a capacity of 200 ml), and the lids of the glass container were closed (PDMS:TTnB:HA=1:1:0.5 as a molar ratio). The content of this glass container was designated "HA-based solution." Subsequently, the glass container with the lids closed was taken out from the glove box. After that, a stirring rod with an attached propeller was inserted into the glass container while dry nitrogen gas flowed in and out through the glass container. Then, the glass container was immersed in an oil bath which was maintained at 30° C., and the HA-based solution was stirred for 24 hours. Subsequently, the glass container was heated to 60° C. and the HA-based solution was stirred for 24 hours. Thereafter, the stirring rod was removed while dry nitrogen gas flowed in and out through the glass container, and a magnetic stir bar was introduced into the glass container. Subsequently, the glass container was sealed with dry nitrogen gas. The glass container was transferred to a magnetic stirrer. After the glass container was put on the magnetic stirrer, the temperature was raised from room temperature to 100° C. while the stir bar was rotated, and the content of the glass container was stirred for 24 hours. Thereafter, the content of the glass container was maintained at 100° C. for 68 hours. During the time period, stirring was performed for 55.5 hours in an open atmosphere by flowing with dry nitrogen gas in and out therein, and then stirring was performed for 12.5 hours in a closed state without flowing dry nitrogen gas. Hereinafter, unless particularly stated otherwise, the speed of rotation of the propeller stirring rod is 100 rpm. In order to investigate the changes in Mw, Mn, Mw/Mn and viscosity of the HA-based solution along with the passage of stirring time, a small amount of the content in the glass container was taken out in the middle of stirring, and it was supplied for the analyses of values as referred above. For the measurement of Mw and Mn, GPC (manufactured by Tosoh Corp., HLC-8220GPC) was used, and the data that had been subjected to waveform separation using "GPC Support Program Ver. 05.00 manufactured by Tosoh Corp.," were used. Hereinafter, unless particularly stated otherwise, the same apparatus as described above was also used to measure the Mw and Mn that will be described later, and data processing was performed using the same program as described above. For the measurement of viscosity, a viscosity analyzer (manufactured by Told Sangyo Co., Ltd., VISCOMETER RE-85) was used. The unit of the viscosity is mPa·s in all cases. Hereinafter, unless particularly stated otherwise, the viscosity was measured using the same apparatus as described above.

For a comparison with the cured product prepared with the HA-based solution, a sample was prepared by curing a solution which used a tin-based catalyst. As the tin-based catalyst, dibutyltin dilaurate (manufactured by Tokyo Chemical Industry Co. Ltd., $C_{32}H_{64}O_4Sn$) was used (hereinafter, simply referred to as a Sn-based catalyst). The preparation conditions for the solution that used the Sn-based catalyst, were as follows. 40 g of PDMS, 13.612 g of TTnB, and 0.4 g of the Sn-based catalyst (equivalent to 1 wt % based on PDMS) were introduced in this order into a glass container with lids, and the lids were closed. After that, a propeller-attached stirring rod was inserted into the glass container while dry nitrogen gas flowed in and out through the glass container. Then, the glass container was immersed in an oil bath which was maintained at 30° C., and the solution in the glass container was stirred for 24 hours. Subsequently, the temperature was raised to 60° C., and stirring was performed for 24 hours. Thereafter, the stirring rod was removed while dry nitrogen gas flowed in and out through the glass container, and a magnetic stir bar was introduced into the glass container. After that, the glass container was sealed with dry nitrogen gas. The glass container was transferred to a magnetic stirrer. The content of the glass container was stirred at 100° C. for 24 hours in a closed atmosphere without flowing dry nitrogen gas. Thereafter, the glass container was maintained at 100° C. for 72.5 hours. During the time period, stirring was performed for 60.5 hours in an open atmosphere with flowing dry nitrogen gas in and out therein, and then stirring was performed for 12 hours in a closed state without flowing dry nitrogen gas. Subsequently, the atmosphere was changed by a fresh dry nitrogen gas, and then stirring was performed at 100° C. for 12 hours in a closed state. Hereinafter, this solution will be referred to as "Sn-1." The preparation conditions for curing the solution were the same as those used in the case of the HA-based solution.

TABLE 1

| Temp. (° C.)/ | HA-based solution (HA) | | | | Comparative solution 1 (Sn) | | | |
|---|---|---|---|---|---|---|---|---|
| Time (hr) -Atmosphere | Mw | Mn | Mw/Mn | Viscosity | Mw | Mn | Mw/Mn | Viscosity |
| 30/24 -close | 2606 | 1920 | 1.36 | 70.0 | 2876 | 1902 | 1.51 | 51.8 |
| 60/24 -close | 2784 | 2158 | 1.29 | 25.8 | 3208 | 2280 | 1.41 | 21.0 |
| 100/24 -close | 2772 | 2100 | 1.32 | 23.1 | 3121 | 2008 | 1.55 | 15.9 |
| 100/24 -open | 2810 | 2018 | 1.35 | 35.5 | 3081 | 1815 | 1.70 | 18.3 |
| 100/29 -open | 3043 | 2185 | 1.39 | 48.7 | — | — | — | — |
| 100/43.5 -open | 3561 | 2432 | 1.44 | 61.4 | — | — | — | — |
| 100/47 -open | 4563 | 3000 | 1.52 | 102.1 | 3345 | 2204 | 1.52 | 88.8 |
| 100/50 -open | 6716 | 4034 | 1.66 | 192.1 | — | — | — | — |
| 100/55.5 -open | — | — | — | — | 3708 | 2585 | 1.43 | 396.5 |
| 100/53 -open | 10125 | 5779 | 1.75 | 568.0 | 4552 | 3246 | 1.40 | 880.0 |
| 100/60.5 -open→ 100/12 -close | — | — | — | — | 4663 | 3354 | 1.39 | 2417.0 |
| 100/55.5 -open→ 100/12.5 -close | 18688 | 10231 | 1.83 | 4585.0 | — | — | — | — |

Figure 2:
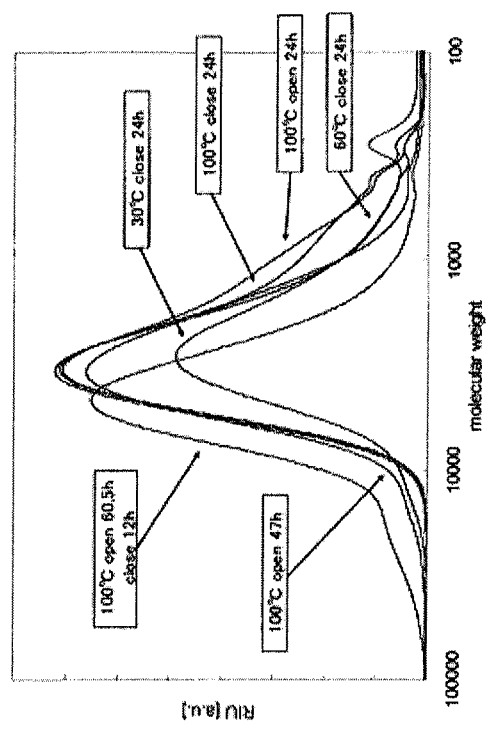
FIG. 2 shows changes in molecular weight distribution along with the passage of stirring period.
Figure 3:
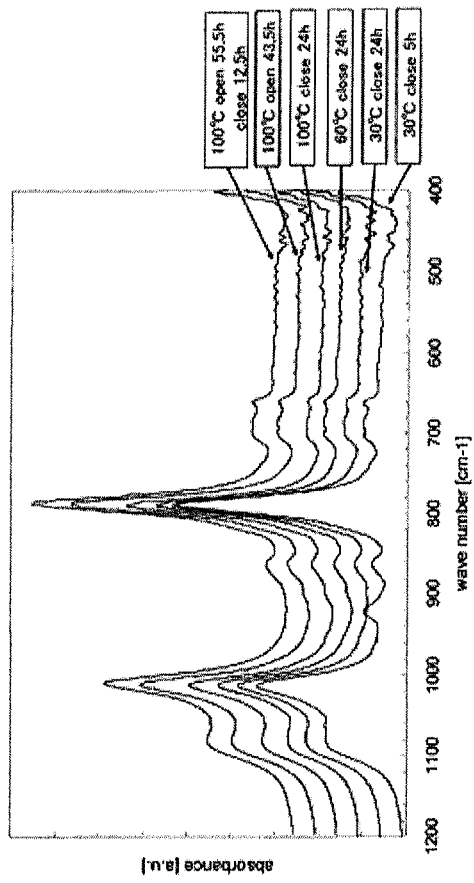
FIG. 3 shows changes in infrared spectra along with the passage of stirring period.
Figure 4:
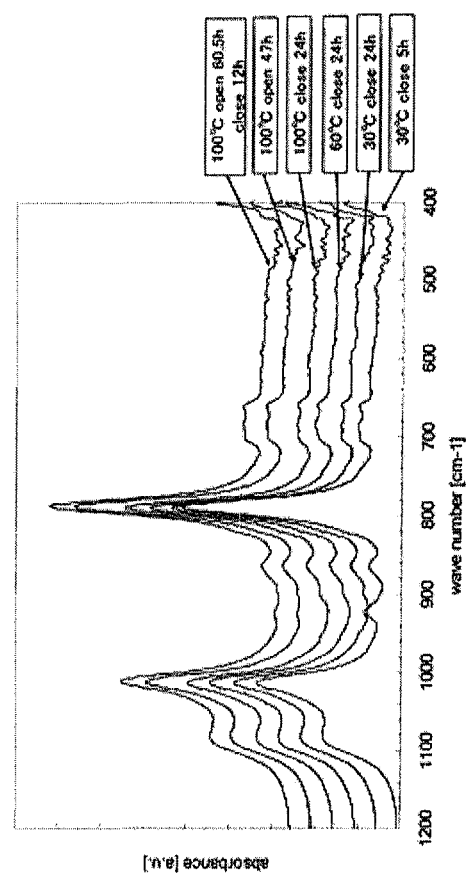
FIG. 4 shows changes in infrared spectra along with the passage of stirring period.

Table 1, FIGS. 1 and 2 show changes in Mw, Mn and Mw/Mn of the HA-based solution and the Comparative Solution 1 along with the passage of stirring time, and the GPC analysis results of the solutions. Also, FIGS. 3 and 4 show changes in infrared spectra of the HA-based solution and the Comparative Solution 1 obtained by a Fourier Transform Infrared Spectroscopic analyzer (hereinafter, referred to as "FT-IR") along with the passage of stirring time. The terms "close" and "open" in the Table 1 and FIGS. 1 to 4 mean stirring in a closed dry nitrogen gas atmosphere, and stirring in an open atmosphere with flowing dry nitrogen gas in and out, respectively.

(2) Evaluation of Solution Prepared by Using DL-Malic Acid Diethyl Ester

In a glove box through which dry nitrogen gas flowed in and out, 40 g of PDMS, 9.13 g of titanium tetraethoxide (tetraethoxytitanium: TTE, manufactured by Merck & Co., Inc.), and 1.52 g of DL-malic acid diethyl ester (MA, manufactured by Tokyo Chemical Industry Co., Ltd.) were introduced into a glass container with lids (capacity: 200 ml), and the lids were closed (PDMS:TTE:MA=1:1:0.2 as a molar ratio). This content was designated "MA-based solution." Subsequently, the glass container with the lids closed was taken out from the glove box. After that, a stirring rod with an attached propeller was inserted into the glass container while dry nitrogen gas flowed in and out through the glass container. Then, the glass container was immersed in an oil bath which was maintained at 30° C. under a closed dry nitrogen gas atmosphere. The MA-based solution was heated to 60° C. and was stirred for 48 hours. While dry nitrogen gas flowed in and out through the glass container, the stirring rod was removed, and a magnetic stir bar was introduced into the glass container. Subsequently, the glass container was sealed with dry nitrogen gas. The glass container was transferred to a magnetic stirrer. After the glass container was put on the magnetic stirrer, the temperature was raised from room temperature to 100° C. At 100° C., while the stir bar was rotated, and the content of the glass container was stirred for 48 hours in a closed dry nitrogen gas atmosphere. Thereafter, dry nitrogen gas flowed in and out through the glass container, and the content in it was stirred for 17 hours. In order to investigate the changes in Mw, Mn, Mw/Mn and viscosity of the MA-based solution along with the passage of stirring time, a small amount of the content in the glass container was taken out in the middle of stirring, and it was supplied for the analyses of values as referred above.

For a comparison with the MA-based solution, a mixture of PDMS and TTE, which did not contain MA (this was designated "Comparative Solution 2"), was prepared, and the mixture was stirred under the same conditions as them used for the preparation of the MA-based solution. A small amount of the content in the glass container was taken out from the glass container in the middle of stirring and just after the completion of stirring, and both of the Mw and Mn values were measured. For the measurement of Mw and Mn, the same analyzer as that used in the case of the HA-based solution was used.

TABLE 2

| Temp. (° C.)/ | MA-based solution (with MA) | | | | Comparative solution 2 (without MA) | | | |
|---|---|---|---|---|---|---|---|---|
| Time (hr) -Atmosphere | Mw | Mn | Mw/Mn | Viscosity | Mw | Mn | Mw/Mn | Viscosity |
| 30/48 -close | 2333 | 1669 | 1.37 | 43.0 | 2623 | 1856 | 1.41 | 31.2 |
| 60/48 -close | 2442 | 1808 | 1.35 | 26.9 | 2794 | 1991 | 1.40 | 20.7 |
| 100/48 -close | 2548 | 1846 | 1.38 | 36.0 | 2904 | 2030 | 1.43 | 55.9 |
| 100/5 -open | 3573 | 2453 | 1.46 | 74.6 | 3088 | 2146 | 1.44 | 826.0 |
| 100/17 -open | 16623 | 7659 | 2.17 | 6015.0 | 3757 | 2580 | 1.46 | N.D. |

Figure 5:
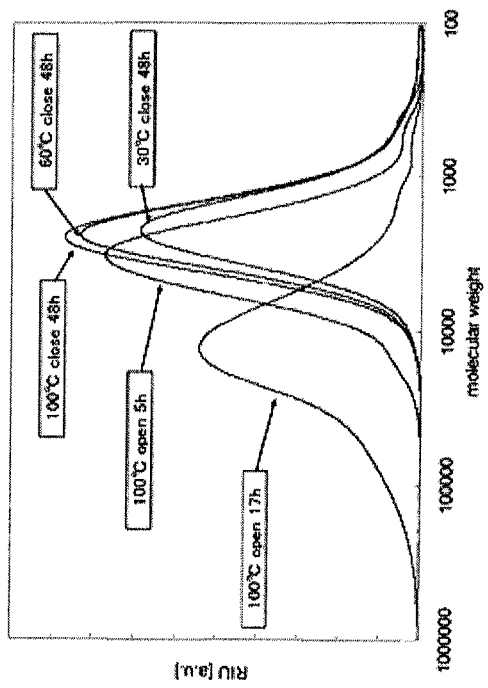
FIG. 5 shows changes in molecular weight distribution along with the passage of stirring period.
Figure 6:
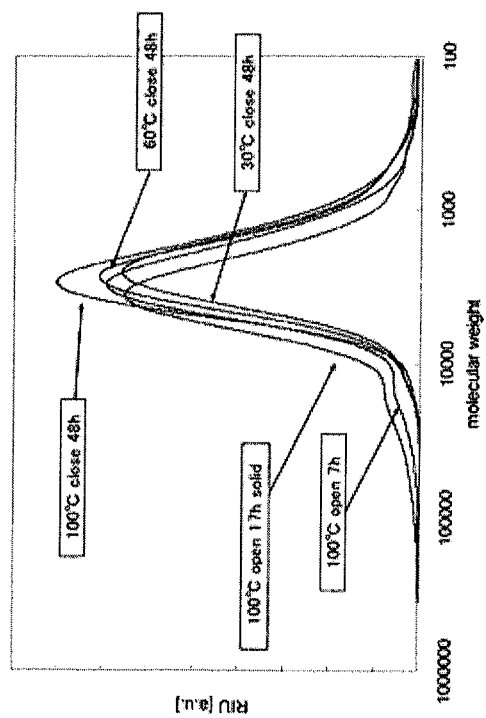
FIG. 6 shows changes in molecular weight distribution along with the passage of stirring period.
Figure 7:
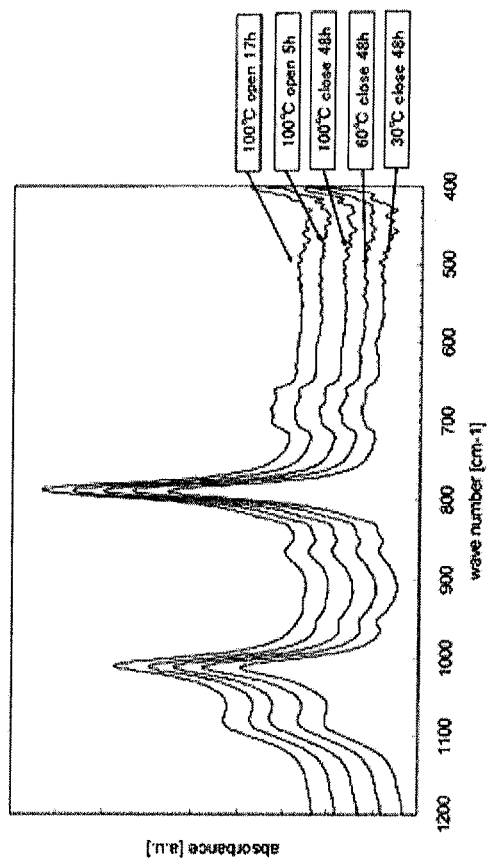
FIG. 7 shows changes in infrared spectra along with the passage of stirring period.
Figure 8:
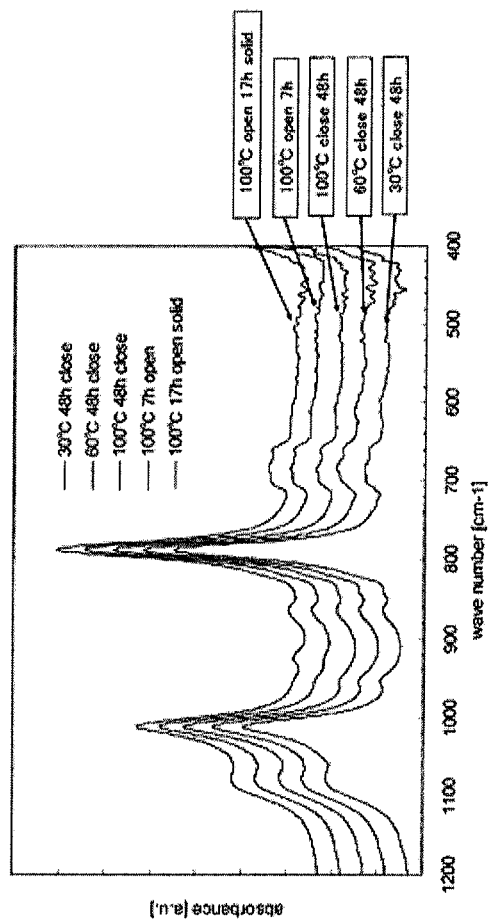
FIG. 8 shows changes in infrared spectra along with the passage of stirring period.

Table 2, FIGS. 5 and 6 show changes in Mw, Mn, Mw/Mn and the GPC analysis results of the MA-based solution and the Comparative Solution 2 for stirring conditions. The term "close" in the Table 2 means stirring in a closed dry nitrogen gas atmosphere. Furthermore, FIGS. 7 and 8 show changes in infrared spectra of the MA-based solution and the Comparative Solution 2 for stirring conditions. The terms "close" and "open" in the Table 2 and FIGS. 5 to 8 mean stirring in a closed dry nitrogen gas atmosphere, and stirring in an open atmosphere with flowing dry nitrogen gas in and out through the glass container, respectively.

2. Experiment 1: Evaluation of Characteristics of Cured Product Prepared by Using Hydroxyacetone and Cured Product Prepared by Using Tin-Based Catalyst (1) Method for Preparing Cured Products In a glove box through which dry nitrogen gas flowed in and out, 40 g of PDMS, 13.612 g of TTnB, and 1.482 g of HA were introduced in this order into a glass container with lids (capacity: 200 ml), and the lids were closed (PDMS:TTE:MA=1:1:0.5 as a molar ratio). Two sets of this content were prepared and were designated "HA sample 1" and "HA sample 2". Subsequently, the two glass containers with the lids closed were taken out from the glove box.

While dry nitrogen gas flowed in and out through the glass container put the HA sample 1, a stirring rod with an attached propeller was inserted into the glass container. After that, it was sealed with dry nitrogen gas. The glass container was immersed in an oil bath that was maintained at 30° C., and the HA sample 1 was stirred for 24 hours. Subsequently, the HA sample 1 was heated to 60° C. and was stirred for 24 hours. While dry nitrogen gas flowed in and out through the glass container, the stirring rod was removed, and a magnetic stir bar was introduced into the glass container. After that, the glass container was sealed with dry nitrogen gas. The glass container was transferred to a magnetic stirrer. After the glass container was put on the magnetic stirrer, the temperature was raised from room temperature to 100° C., and the content of the glass container was stirred for 24 hours. Thereafter, the content of the glass container was further stirred at 100° C. for 68 hours. During the time period, stirring was performed for 55.5 hours in an open atmosphere with flowing dry nitrogen gas in and out therein, and then stirring was performed for 12.5 hours in a closed dry nitrogen gas atmosphere. On the other hand, while dry nitrogen gas flowed in and out through the glass container, a stirring rod with an attached propeller was inserted into the glass container, and the glass container was immersed in an oil bath that was maintained at 30° C., and the HA sample 2 was stirred for 24 hours. Subsequently, the HA sample 2 was heated to 60° C. and was stirred for 24 hours. While dry nitrogen gas flowed in and out through the glass container, the stirring rod was removed, and a magnetic stir bar was introduced into it. Subsequently, the glass container was sealed with dry nitrogen gas. The glass container was transferred to a magnetic stirrer. After the glass container was put on the magnetic stirrer, the temperature was raised from room temperature to 100° C., and the content of the glass container was stirred at 100° C. for 24 hours. Thereafter, by changing the closed atmosphere to an open one by flowing dry nitrogen gas in and out through the glass container, the HA sample 2 was stirred at 100° C. for 52 hours. The viscosity, Mw and Mw/Mn of the HA sample 1 just before the completion of stirring were 4585 mPa·s, 18688, and 1.83, respectively. The viscosity is a value measured at 30° C. The viscosity measurement that followed was carried out at the same temperature. This solution obtained after stirring was designated "HA0.5-1." On the other hand, the viscosity, Mw and Mw/Mn of the HA sample 2 just before the completion of stirring were 359.7 m·s, 8633, and 1.74, respectively. This solution obtained after stirring was designated "HA0.5-2."

Subsequently, the two solutions obtained after stirring were poured into petri dishes made of polytetrafluoroethylene (PTFE) having an inner diameter of 95 mm, and the petri dishes were left in an atmosphere at 30° C. and 65% RH for 24 hours. The petri dishes were then kept in a thermoregulated oven (ETTAS OFW-300, manufactured by AS ONE Corp.) at 60° C. for 48 hours, and were naturally cooled to room temperature. After the cooling, sheet-like cured products (95 mm in diameter×1.3 mm in thickness) were removed from the petri dishes.

For a comparison with the cured products prepared with the HA-based solution, a sample was prepared by curing a solution which used a tin-based catalyst. As the tin-based catalyst, dibutyltin dilaurate (manufactured by Tokyo Chemical Industry Co. Ltd., $C_{32}H_{64}O_4Sn$) was used (hereinafter, simply referred to as a Sn-based catalyst). The preparation conditions for the solution that used the Sn-based catalyst, were as follows. 40 g of PDMS, 13.612 g of TTnB, and 0.4 g of the Sn-based catalyst (equivalent to 1 wt % based on PDMS) were introduced in this order into a glass container with lids, and the lids were closed. After that, a propeller-attached stirring rod was inserted into the glass container while dry nitrogen gas flowed in and out through it. After the glass container was sealed with dry nitrogen gas, the glass container was immersed in an oil bath which was maintained at 30° C. The content of the glass container was stirred for 24 hours, subsequently the temperature was raised to 60° C., and stirring was performed for 24 hours. While dry nitrogen gas flowed in and out through the glass container, the stirring rod was removed, and a magnetic stir bar was introduced into the glass container. Thereafter, the glass container was sealed with dry nitrogen gas. The glass container was transferred to a magnetic stirrer and it was heated to 100° C. The content of the glass container was stirred at 100° C. for 24 hours while the stir bar was rotated in a closed dry nitrogen gas atmosphere. Thereafter, the glass container was maintained at 100° C. for 72.5 hours. During the time period, stirring was performed for 60.5 hours in an open atmosphere by flowing dry nitrogen gas in and out through the glass container, and then stirring was performed for 12 hours in a closed state by stopping the flow. The viscosity, Mw and Mw/Mn of the solution employing the Sn-based catalyst just after stirring were 2417 mPa·s, 4663, and 1.39, respectively. Hereinafter, this solution will be referred to as "Sn-1." The preparation conditions for the cured product were the same as them used in the case of the HA-based solution.

(2) Evaluation of Tensile Characteristics

Each of sheet-like cured product was punched into a dumbbelled-shape, and thus a specimen for tensile test was prepared. A tensile test was carried out according to JIS K6251 using an Autograph (AGS-J: SHIMADZU). The crosshead speed was 500 mm/min Hereinafter, the tensile test was conducted at the same crosshead speed of 500 mm/min.

TABLE 3

| Evaluation item for tensile test | HA0.5-1 Cured product | HA0.5-2 Cured product | Sn-1 Cured product (Comparative) |
|---|---|---|---|
| Elastic modulus (MPa) | 0.54 | 0.55 | 0.53 |
| Strength at break (MPa) | 0.47 | 0.46 | 0.15 |
| Elongation at break (%) | 129 | 117 | 32 |

Table 3 shows the evaluated results of the tensile characteristics of the cured product prepared by curing HA0.5-1 (HA0.5-1 cured product), the cured product prepared by curing HA0.5-2 (HA0.5-2 cured product), and the cured product prepared by curing Sn-1 (Sn-1 cured product).

As shown in Table 3, it was found that the cured products prepared by using the HA-based solution have higher strength at break and elongation at break than the cured product prepared by using a Sn-based catalyst. Furthermore, from a comparison between the two kinds of cured products prepared by using the HA-based solution, almost the same characteristics were obtained in terms of all of the elastic modulus, strength at break, and elongation at break.

(3) Evaluation of Adhesion Performance

Figure 9:
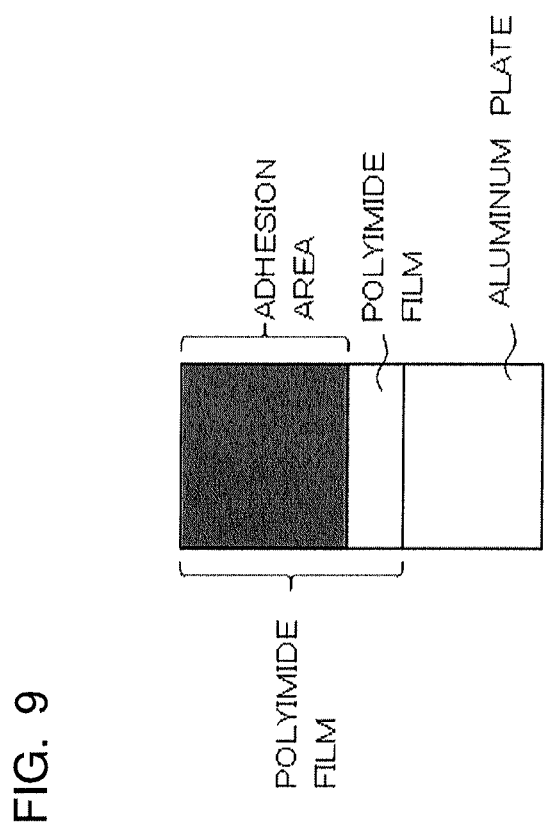
FIG. 9 is a plane view of an aluminum plate used in an adhesion performance test, indicating an adhesion area.
Figure 10:
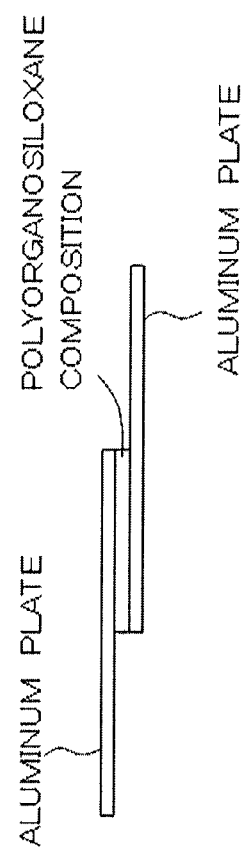
FIG. 10 is a lateral view of a specimen in which a polyorganosiloxane composition is placed between the respective adhesion areas of aluminum plates.
Figure 11:
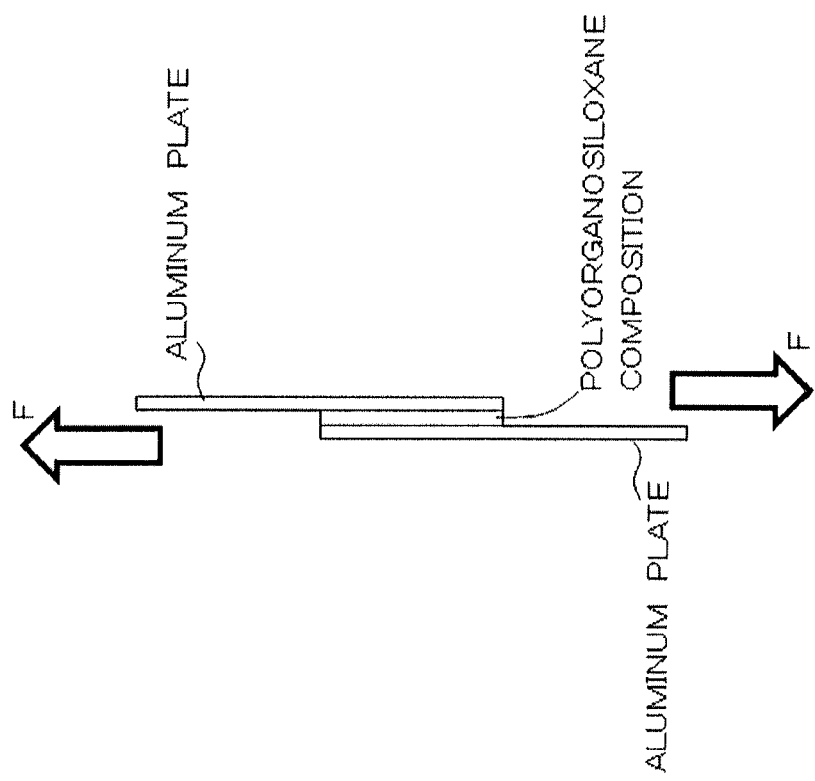
FIG. 11 is a conceptual diagram showing a specimen for the tensile test.

FIGS. 9 to 11 show explanations for the evaluation of adhesion performance.

Two aluminum plates having a size of 20 mm in width×50 mm in length×2 mm in thickness were prepared. As shown in FIG. 9, a tape made of polyimide was affixed to the aluminum plates in two-fold (thickness of the two-fold is about 240 μm), such that the taping can specify the adhesion areas (20 mm in width×20 mm in length, area: 400 $mm^2$) on the aluminum plates. After the HA0.5-1 was pasted on both the adhesion areas of the aluminum plates, and the aluminum plates were put into the thermoregulated oven at 60° C. for 30 minutes for pre-curing. After the pre-curing, the aluminum plates were taken out from the oven, and the two pasted areas were put together. Thereafter, the aluminum plates were left at 30° C. and 65% RH for 24 hours. After that, curing the adhesion specimen was carried out at 60° C. for 48 hours and 96 hours. Thus, the specimen as shown in FIG. 10 was prepared. Also for the HA0.5-2 and Sn-1 samples, the specimens in the form of two aluminum plates were prepared by the same manner as described above.

Subsequently, the two ends of the specimen was as shown FIG. 11 pulled each other in the opposite direction, and the adhesive strength was determined based on the tensile force measured when the adhesion was broken. The measurement of the adhesive strength was carried out by using an Autograph (AGS-J, SHIMADZU) at 5.0 mm/min of the crosshead speed. Hereinafter, the measurement conditions for adhesive strength were the same as the manner described above, unless particularly stated otherwise. Furthermore, the adhesive strength [$N/mm^2$] was calculated by dividing the tensile force [N] by the adhesion area [$mm^2$].

TABLE 4

| | HA Cured product | | | | Sn Cured product | |
|---|---|---|---|---|---|---|
| Evaluation | HA0.5-1 | | HA0.5-2 | | Sn-1 | |
| of adhesion | 96 hr | 48 hr | 96 hr | 48 hr | 96 hr | 48 hr |
| Adhesive strength ($N/mm^2$) | 0.43 | 0.27 | 0.36 | 0.21 | 0.15 | 0.11 |

Table 4 shows the evaluated results of adhesive strength.

From the comparison of the adhesion specimens made with the solutions using HA and Sn-catalyst in Table 4, it was found that the HA cured products show higher adhesive strength than the Sn cured product. Furthermore, for all of the cured products, the specimens that were prepared with a longer curing period (that is, specimens cured for 96 hours) had higher adhesive strength than others. In addition, from a comparison between HA cured products, if the curing period was equal, the specimen that had larger Mw (that is, specimens of the HA0.5-1 cured product) showed higher adhesive strength than the HA0.5-2 cured product.

3. Experiment 2: Evaluation of Characteristics of Cured Products prepared by Changing Type of Titanium Alkoxide (1) Method for Preparing Cured Products (1. a) TTnB-HA System In a glove box through which dry nitrogen gas flowed in and out, 50 g of PDMS, 17.015 g of TTnB, and 1.853 g of HA were introduced in this order into a glass container with attached lids (capacity: 200 ml), and the lids were closed (PDMS:TTnB:HA=1:1:0.5 as a molar ratio). Two sets of this content were prepared, and were designated "HA sample 3" and "HA sample 4," respectively. Subsequently, the two glass containers with the lids closed were taken out from the glove box. While dry nitrogen gas flowed in and out through the glass container put the HA sample 3, a stirring rod with an attached propeller was inserted into the glass container, and the glass container was immersed in an oil bath that was maintained at 60° C., and the HA sample 3 was stirred for 24 hours. While dry nitrogen gas flowed in and out through the glass container, the stirring rod was removed, and a magnetic stir bar was introduced into the glass container. Subsequently, the glass container was sealed with dry nitrogen gas. The HA sample 3 was heated to 100° C. and stirred for 72 hours, and then was maintained at 100° C. for 92.5 hours. During the time period, stirring was performed for 80 hours in an open atmosphere with dry nitrogen gas flowed in and out therein, and then stirring was performed for 12.5 hours in a closed state without flowing dry nitrogen gas.

On the other hand, while dry nitrogen gas flowed in and out the glass container put the HA sample 4, a stirring rod with an attached propeller was inserted into the glass container, and the glass container was immersed in an oil bath that was maintained at 60° C., and the HA sample 4 was stirred for 24 hours while dry nitrogen gas flowed in and out through the glass container. After that, the stirring rod was removed, and a magnetic stir bar was introduced into the glass container. Subsequently, the glass container was sealed with dry nitrogen gas. The glass container was transferred to a magnetic stirrer. After the glass container was put on the magnetic stirrer, the temperature was raised from room temperature to 100° C. while the magnetic stir bar was rotated, and the solution of the glass container was stirred for 120 hours. Thereafter, the atmosphere was changed to an open atmosphere with flowing dry nitrogen gas in and out through the glass container, and the HA sample 4 was stirred at 100° C. for 97 hours. The viscosity, Mw and Mw/Mn of the HA sample 3 just before the completion of stirring were 2908.5 mPa·s, 19748, and 1.85, respectively. This solution prepared after stirring for 72 hours was designated "HA0.5-TTnB-72." On the other hand, the viscosity, Mw and Mw/Mn of the HA sample 4 just before the completion of stirring were 10085 mP·s, 22976, and 1.84, respectively. This solution prepared after stirring for 120 hours was designated "HA0.5-TTnB-120."

After stirring the solutions, the two kinds of solutions were separately poured into petri dishes having the same shape as them used in Experiment 1, and the petri dishes were left for 24 hours in an atmosphere at 30° C. and 65% RH. The petri dishes were then kept in a thermoregulated oven at 60° C. (the same oven as that used in Experiment 1) for 96 hours or 168 hours, and the petri dishes were naturally cooled to room temperature. After cooling, sheet-like cured products (95 mm in diameter×1.3 mm in thickness) were removed from the petri dishes.

(1. b) TTE-HA System

In a glove box through which dry nitrogen gas flowed in and out, 50 g of PDMS, 11.4075 g of TTE, and 1.853 g of HA were introduced in this order into a glass container with attached lids (capacity: 200 ml), and the lids were closed (PDMS:TTE:HA=1:1:0.5 as a molar ratio). This solution was designated "HA sample 5." Subsequently, the glass container with the lids closed was taken out from the glove box, and was immersed in an oil bath that was maintained at 60° C. While dry nitrogen gas flowed in and out through the glass container, a stirring rod with an attached propeller was inserted into the glass container, and the HA sample 5 was stirred at 60° C. for 48 hours. After that, the stirring rod was removed while dry nitrogen gas flowed in and out through the glass container, and a magnetic stir bar was introduced into the glass container. Subsequently, the glass container was sealed with dry nitrogen gas. The glass container was transferred to a magnetic stirrer. After the glass container was put on the magnetic stirrer, the solution of the glass container was heated from room temperature to 100° C. and stirred for 72 hours while the magnetic stir bar was rotated. Subsequently, the atmosphere was changed to an open atmosphere by flowing dry nitrogen gas in and out through the glass container, and stirring was performed for 16 hours at 100° C. Since the HA sample 5 was solidified at the end, the viscosity could not be measured. The Mw and Mw/Mn of the HA sample 5 were 9940 and 1.78, respectively. In addition, since this sample was not available for preparation of a cured product, the subsequent characteristic evaluation of the cured product was not carried out.

(1. c) TTIP-HA system

In a glove box through which dry nitrogen gas flowed in and out, 50 g of PDMS, 14.211g of titanium tetraisopropoxide (TTIP; manufactured by Kanto Chemical Co., Inc.), and 1.853 g of HA were introduced in this order into a glass container with attached lids (capacity: 200 ml), and the lids were closed (PDMS:TTIP:HA=1:1:0.5 as a molar ratio). This solution was designated "HA sample 6." Subsequently, the glass container with the lids closed was taken out from the glove box. While dry nitrogen gas flowed in and out through the glass container, a stirring rod with an attached propeller was inserted into the glass container, and the glass container was immersed in an oil bath that was maintained at 60° C. and the HA sample 6 was stirred for 120 hours. While dry nitrogen gas flowed in and out through the glass container, the stirring rod was removed, and a magnetic stir bar was introduced into the glass container. Subsequently, the glass container was sealed with dry nitrogen gas. The glass container was transferred to a magnetic stirrer. After the glass container was put on the magnetic stirrer, the solution of the glass container was heated from room temperature to 100° C. and stirred for 48hours while the stir bar was rotated. Thereafter, the atmosphere was changed to an open atmosphere by flowing dry nitrogen gas in and out through the glass container, and stirring was performed at 100° C. for 18 hours. The viscosity, Mw and Mw/Mn of the HA sample 6 just before the completion of stirring were 1985.3 mPa·s, 6602, and 1.54, respectively. This solution prepared after stirring for 48 hours was designated "HA0.5-TTIP-48."

After preparing the stirred solution, it was poured into a petri dish having the same shape as that used in Experiment 1, and the petri dish was left for 24 hours in an atmosphere at 30° C. and 65% RH. The petri dish was then kept in a thermoregulated oven at 60° C. (the same oven as that used in Experiment 1) for 96 hours or 168 hours. Thereafter, the petri dish was naturally cooled to room temperature. After cooling, a sheet-like cured product (95 mm in diameter×1.3 mm in thickness) was removed from the petri dish.

(1. d) TTnB-Sn System (Comparative Material)

For a comparison of the above-described cured products prepared by using HA, a sample was prepared by curing a solution which employed a Sn-based catalyst. The preparation procedure for the solution that employed the Sn-based catalyst, was as follows. In a glove box through which dry nitrogen gas flowed in and out, 40 g of PDMS, 13.612 g of TTnB, and 1.2 g of the Sn-based catalyst (equivalent to 3 wt % based on PDMS) were introduced in this order into a glass container with lids (capacity: 200 ml). After that, the lids were closed. A propeller-attached stirring rod was inserted into the glass container while dry nitrogen gas flowed in and out through the glass container, and the glass container was immersed in an oil bath which was maintained at 60° C. The content of the glass container was stirred for 24 hours while dry nitrogen gas flowed in and out through the glass container. The viscosity, Mw and Mw/Mn of the solution obtained after stirring, which used the Sn-based catalyst, were 19.2 mPa·s, 2956, and 1.51, respectively. Hereinafter, this solution will be referred to as "Sn-TTnB." The preparation conditions for the cured product were the same as them used in the case of using HA.

(2) Evaluation of Tensile Characteristics

Each sheet-like cured product was punched into a dumbbelled-shape, and thus a specimen for tensile test was prepared. A tensile test was carried out according to JIS K6251 using an Autograph (AGS-J: SHIMADZU).

Figure 12:
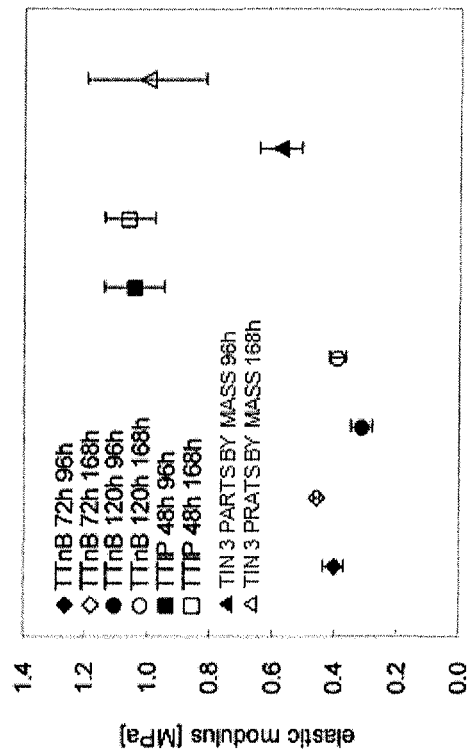
FIG. 12 shows the elastic moduli of various specimens.
Figure 13:
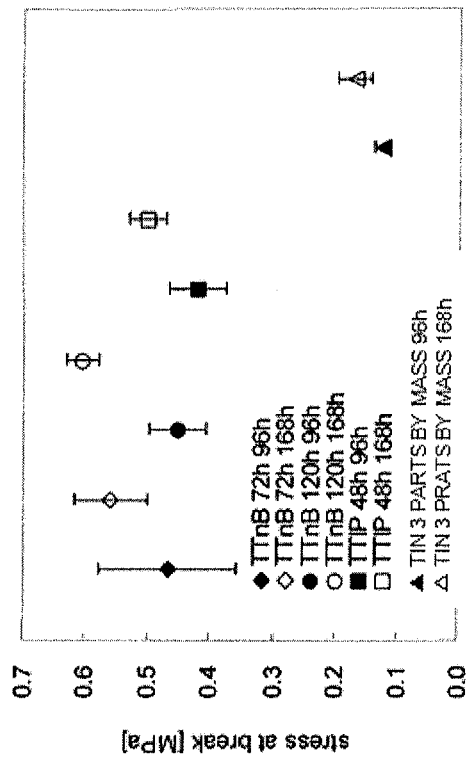
FIG. 13 shows the strengths at break of various specimens.
Figure 14:
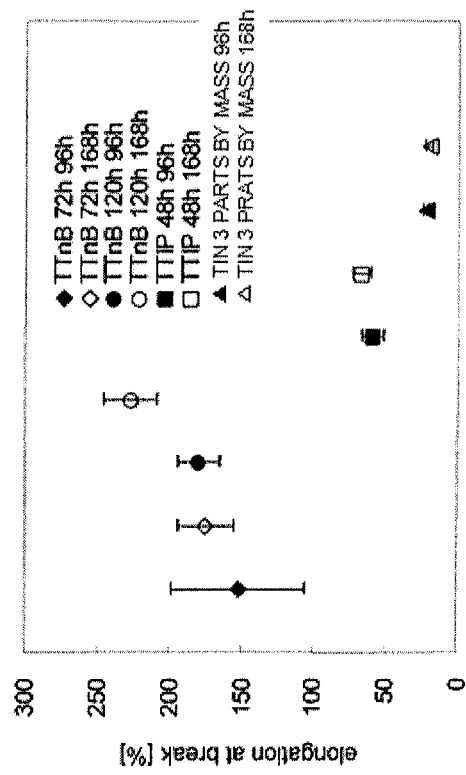
FIG. 14 shows the elongations at break of various specimens.

FIGS. 12 to 14 show the evaluated results of the tensile characteristics of various specimens. FIG. 12 shows the elastic moduli of various specimens, FIG. 13 shows the strengths at break of various specimens, and FIG. 14 shows the elongations at break of various specimens. In these figures, the term "TTnB 72 h 96 h" indicates a specimen cut out from the cured product prepared by curing the solution "HA0.5-TTnB-72" under the conditions of 60° C. and 96 hours. Similarly, the term "TTnB 72 h 168 h" indicates a specimen cut out from the cured product prepared by curing the solution "HA0.5-TTnB-72" under the conditions of 60° C. and 168 hours; the term "TTnB 120 h 96 h" indicates a specimen cut out from the cured product prepared by curing the solution "HA0.5-TTnB-120" under the conditions of 60° C. and 96 hours; the term "TTnB 120 h 168 h" indicates a specimen cut out from the cured product prepared by curing the solution "HA0.5-TTnB-120" under the conditions of 60° C. and 168 hours; the term "TTIP 48 h 96 h" indicates a specimen cut out from the cured product prepared by curing the solution "HA0.5-TTIP-48" under the conditions of 60° C. and 96 hours; the term "TTIP 48 h 168 h" indicates a specimen cut out from the cured product prepared by curing the solution "HA0.5-TTIP-48" under the conditions of 60° C. and 168 hours; the term "TIN 3 PARTS BY MASS 96 h" indicates a specimen cut out from the cured product prepared by curing the solution "Sn-TTnB" under the conditions of 60° C. and 96 hours; and the term "TIN 3 PARTS BY MASS 168 h" indicates a specimen cut out from the cured product prepared by curing the solution "Sn-TTnB" under the conditions of 60° C. and 168 hours.

As shown in FIG. 13, all of the cured products prepared by using HA had higher strengths at break than the cured products prepared by using the Sn-based catalyst. Furthermore, from a comparison of the cured products prepared by using HA in FIGS. 12 and 14, it was found that the cured products prepared by using TTIP as the titanium alkoxide had higher elastic moduli and smaller elongations at break than the cured products prepared by using TTnB.

(3) Evaluation of Adhesion Performance

The adhesion specimens were prepared by using the solutions of the TTnB-HA system, TTIP-HA system and TTnB-Sn system. The measurement of the adhesive strength was conducted by using the same method as described above, which is based on FIGS. 9 to 11. The adhesion specimens cured at 60° C. for 96 hours and 168 hours were evaluated.

curing the solution "HA0.5-TTnB-120" under the conditions of 60° C. and 96 hours; the term "TTnB 120 h 168 h" indicates the adhesion specimen prepared by curing the solution "HA0.5-TTnB-120" under the conditions of 60° C. and 168 hours; the term "TTIP 48 h 96 h" indicates the adhesion specimen prepared by curing the solution "HA0.5-TTIP-48" under the conditions of 60° C. and 96 hours; the term "TTIP 48 h 168 h" indicates the adhesion specimen prepared by curing the solution "HA0.5-TTIP-48" under the conditions of 60° C. and 168 hours; the term "TIN 3 PARTS BY MASS 96 h" indicates the adhesion specimen prepared by curing the solution "Sn-TTnB" under the conditions of 60° C. and 96 hours; and the term "TIN 3 PARTS BY MASS 168 h" indicates the adhesion specimen prepared by curing the solution "Sn-TTnB" under the conditions of 60° C. and 168 hours.

From a comparison of the adhesion specimens prepared by using HA and Sn-based catalysts respectively in Table 5, it was found that the HA cured products had higher adhesive strengths than the Sn cured product. Furthermore, for all of the cured products, the specimens that were prepared with a longer curing period (that is, specimens cured for 168 hours) had higher adhesive strengths than others. In addition, from a comparison of the HA cured products, the specimens prepared by using TTIP as the titanium alkoxide showed higher adhesive strength than that prepared by using TTnB.

4. Experiment 3: Examination of effect of amount of hydroxyacetone and stirring temperature on cured products (1) Method for preparing cured products In a glove box through which dry nitrogen gas flowed in and out, 50 g of PDMS, 17.015 g of TTnB, and 3.706 g of HA were introduced in this order into a glass container with lids (capacity: 200 ml), and the lids were closed (PDMS:TTnB:HA=1:1:1 as a molar ratio). This content was designated "HA sample 7." Furthermore, 50 g of PDMS, 17.015g of TTnB, and 1.853 g of HA were introduced into another glass container by the same procedure, and the lids were closed (PDMS:TTnB:HA=1:1:0.5 as a molar ratio). Two sets of contents were prepared, and the contents were designated "HA sample 8" and "HA sample 9," respectively. Subsequently, the three glass containers with their lids closed were taken out from the glove box. While dry nitrogen gas flowed in and out through the glass container, a stirring rod with an attached propeller was inserted into each glass container. The HA sample 7 was stirred at 30° C. for 24 hours by flowing dry nitrogen gas in and out through the glass container. After that, the stirring rod was removed, and a magnetic stir bar was introduced into the glass container while dry nitrogen gas

TABLE 5

| Evaluation | HA Cured product | | | | | | Sn Cured product Sn-TTnB | |
|---|---|---|---|---|---|---|---|---|
| | HA0.5-TTnB-72 | | HA0.5-TTnB-120 | | HA0.5-TTIP-48 | | | |
| of adhesion | 168 hr | 96 hr | 168 hr | 96 hr | 168 hr | 96 hr | 168 hr | 96 hr |
| Adhesive strength (N/mm$^2$) | 0.51 | 0.34 | 0.43 | 0.36 | 0.68 | 0.52 | 0.27 | 0.15 |

Figure 15:
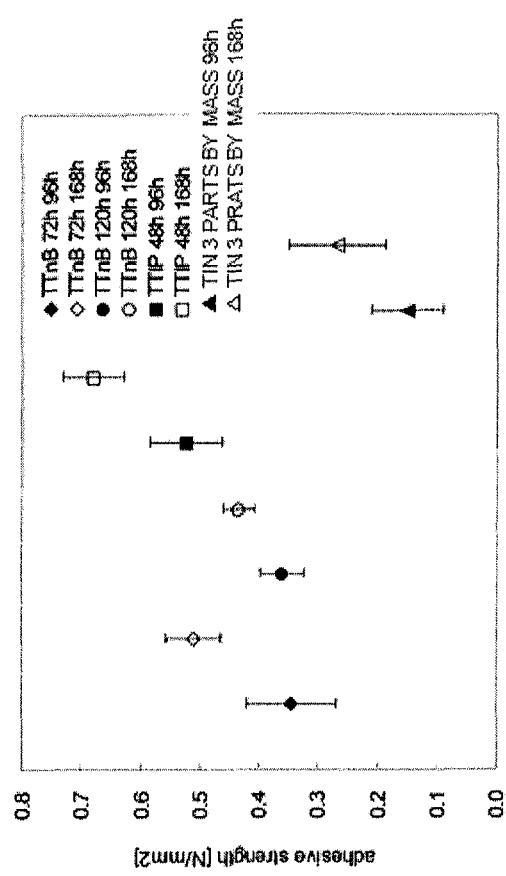
FIG. 15 shows the adhesive strengths of various specimens.

Table 5 and FIG. 15 show the evaluated results of adhesive strength. In FIG. 15, the term "TTnB 72 h 96 h" indicates the adhesion specimen prepared by curing the solution "HA0.5-TTnB-72" under the conditions of 60° C. and 96 hours. Similarly, the term "TTnB 72 h 168 h" indicates the adhesion specimen prepared by curing the solution "HA0.5-TTnB-72" under the conditions of 60° C. and 168 hours; the term "TTnB 120 h 96 h" indicates the adhesion specimen prepared by flowed in and out through the glass container. Subsequently, the glass container was sealed with dry nitrogen gas. The glass container was transferred to a magnetic stirrer. After the glass container was put on the magnetic stirrer, the temperature was raised from room temperature to 100° C. while the magnetic stir bar was rotated, and the HA sample 7 was stirred for 48 hours. Thereafter, the atmosphere was changed to an open atmosphere by flowing dry nitrogen gas in and out, and the HA sample 7 was stirred at 100° C. for 92.5 hours. During the time period, stirring was carried out for 76.5 hours in an open atmosphere by flowing dry nitrogen gas in and out therein, and then stirring was carried out for 16 hours in a closed state without flowing dry nitrogen gas.

For the HA sample 8, it was stirred at 60° C. for 24 hours under a closed atmosphere without flowing dry nitrogen gas in and out, and was heated to 100° C. and stirred at 100° C. for 48 hours. Subsequently, the HA sample 8 was stirred for 66 hours at 100° C. under an open atmosphere by flowing dry nitrogen gas in and out. The HA sample 9 was stirred at 60° C. for 72 hours under a closed atmosphere without flowing dry nitrogen gas. After that, the HA sample 9 was stirred at 60° C. for 88 hours by flowing dry nitrogen gas in and out through the glass container.

The viscosity, Mw and Mw/Mn of the HA sample 7 just before the completion of stirring were 4453.7 mP·s, 32622, and 1.69, respectively. This solution prepared after stirring was designated "HA1-TTnB-100." The viscosity, Mw and Mw/Mn of the HA sample 8 just before the completion of stirring were 10095 mPa·s, 16977, and 1.88, respectively. This solution prepared after stirring was designated "HA0.5-TTnB-100." Furthermore, the viscosity, Mw and Mw/Mn of the HA sample 9 just before the completion of stirring were 102333.3 mPa·s, 3090, and 1.42, respectively. This solution prepared after stirring was designated "HA0.5-TTnB-60." The same apparatus as that used in Experiment 1 was used for the measurement of viscosity and the measurement of Mw and the like.

Procedure for preparing cured sheet with three solutions is as follows. The three solutions prepared after stirring were separately poured into petri dishes having the same shape as them used in Experiment 1. Thereafter, the petri dishes were kept in a thermoregulated oven (the same oven as that used in Experiment 1) at 105° C. for 48 hours, and then the petri dishes were naturally cooled to room temperature. After cooling, sheet-like cured products (95 mm in diameter×1.3 mm in thickness) were removed from the petri dishes. In regard to the appearance, the cured product of HA0.5-TTnB-60 had a crimson color, which was different from the color (pale yellow) of the other two kinds of cured products.

(2) Evaluation of Tensile Characteristics

Each sheet-like cured product was punched into a dumbbelled-shape, and thus a specimen for tensile test was prepared. A tensile test was carried out according to JIS K6251 using an Autograph (AGS-J: SHIMADZU).

TABLE 6

| Evaluation item for tensile test | HA1-TTnB-100 Cured product | HA0.5-TTnB-100 Cured product | HA0.5-TTnB-60 Cured product |
|---|---|---|---|
| Elastic modulus (MPa) | 0.05 | 0.60 | 1.65 |
| Strength at break (MPa) | 0.22 | 0.56 | 0.49 |
| Elongation at break (%) | 635 | 154 | 45 |

Table 6 shows the evaluated results of the tensile characteristics of the cured product prepared by curing HA1-TTnB-100 (HA-TTnB-100 cured product), the cured product prepared by curing HA0.5-TTnB-100 (HA0.5-TTnB-100 cured product), and the cured product prepared by curing HA0.5-TTnB-60 (HA0.5-TTnB-60 cured product).

As shown in Table 6, the cured products in which the mole of HA was 0.5 showed higher elastic modulus and strength at break than the others. On the contrary, it was found that the HA-TTnB-100 cured product showed larger elongation at break than the others with the smaller amount of HA being 0.5 moles. Furthermore, from a comparison between the two cured products in which the mole of HA was 0.5, it was found that the cured product prepared by curing the solution stirred at 60° C. showed higher elastic modulus and smaller elongation at break than the cured product prepared by the solution stirred at 100° C.

(3) Evaluation of adhesion performance

The specimens cured with solutions of HA1-TTnB-100, HA0.5-TTnB-100, and HA0.5-TTnB-60 were evaluated for their adhesive strength, using the same evaluation method as described above, which was based on FIGS. 9 to 11 shown above. The adhesion specimens cured at 105° C. for 48 hours and 96 hours were evaluated.

TABLE 7

| | HA Cured product | | | | | |
|---|---|---|---|---|---|---|
| | HA1-TTnB-100 | | HA0.5-TTnB-100 | | HA0.5-TTnB-60 | |
| Evaluation of adhesion | 96 hr | 48 hr | 96 hr | 48 hr | 96 hr | 48 hr |
| Adhesive strength (N/mm$^2$) | 0.12 | 0.04 | 0.36 | 0.25 | 0.72 | 0.42 |

Table 7 shows the evaluated of adhesive strength.

As is obvious from Table 7, it was found that the cured products prepared with the solutions in which the mole of HA was 0.5 showed higher adhesive strength than the cured product prepared with the solution in which the mole of HA was 1.0. Furthermore, the cured products prepared with the solution which had been stirred for a long period (that is, cured products cured for 96 hours) showed higher adhesive strength than them for a short period. In addition, from a comparison between the two cured products prepared with the solutions in which the mole of HA was 0.5, the cured products prepared with the solution which was stirred at 60° C. showed higher adhesive strength than the cured product prepared with the solution stirred at 100° C.

5. Experiment 4: Evaluation of Characteristics of Cured Products Prepared by Using DL-Malic Acid Diethyl Ester and Cured Products Prepared by Using Tin-Based Catalyst (1) Method for Preparing Cured Products In a glove box through which dry nitrogen gas flowed in and out, 50 g of PDMS, 11.408 g of TTE, and 0.95 g of MA were introduced in this order into a glass container with attached lids (separable flask having a capacity of 200 ml) (PDMS:TTE:MA=1:1:0.1 as a molar ratio). This solution was designated "MA-based sample." After that, the glass container was closed with the lids, and the glass container was taken out from the glove box. While dry nitrogen gas flowed in and out through the glass container, a stirring rod with an attached propeller was inserted into the glass container. Thereafter, the glass container was immersed in an oil bath which was maintained at 60° C. The MA-based sample was then stirred at 60° C. for 24 hours. After that, the stirring rod was removed, and a magnetic stir bar was introduced into the glass container while dry nitrogen gas flowed in and out through the glass container. Subsequently, the glass container was sealed with dry nitrogen gas. The glass container was transferred to a magnetic stirrer. After the glass container was put on the magnetic stirrer, the temperature was further raised from room temperature to 100° C. while the magnetic stir bar was rotated, and the content of the glass container was stirred for 48 hours in a closed state without flowing dry nitrogen gas. After that, the content of the glass container was stirred at 100° C. for 14 hours while dry nitrogen gas flowed in and out through the glass container. The viscosity, Mw and Mw/Mn of the MA-based sample after stirring were 492.8 mPa·s, 5569, and 1.44, respectively.

15 g of the MA-based sample was poured into a petri dish having the same shape as that used in Experiment 1, and the petri dish was kept in a thermoregulated oven maintained at 60° C. for 48 hours. Thereafter, the MA-based sample was naturally cooled to room temperature. After cooling, a sheet-like cured product (95 mm in diameter×1.3 mm in thickness) was removed from the petri dish. In addition, for a comparison with the above-described cured product which used MA, the Sn-1 cured product used in Experiment 1 was provided for the evaluation.

(2) Evaluation of Tensile Characteristics

Each sheet-like cured product was punched into a dumb-belled-shape, and thus a specimen for tensile test was prepared. A tensile test was carried out according to JIS K6251 using an Autograph (AGS-J: SHIMADZU).

TABLE 8

| Evaluation item for tensile test | MA-based sample Cured product | Sn-1 Cured product |
| --- | --- | --- |
| Elastic modulus (MPa) | 0.12 | 0.53 |
| Strength at break (MPa) | 0.14 | 0.15 |
| Elongation at break (%) | 132 | 32 |

Figure 16:
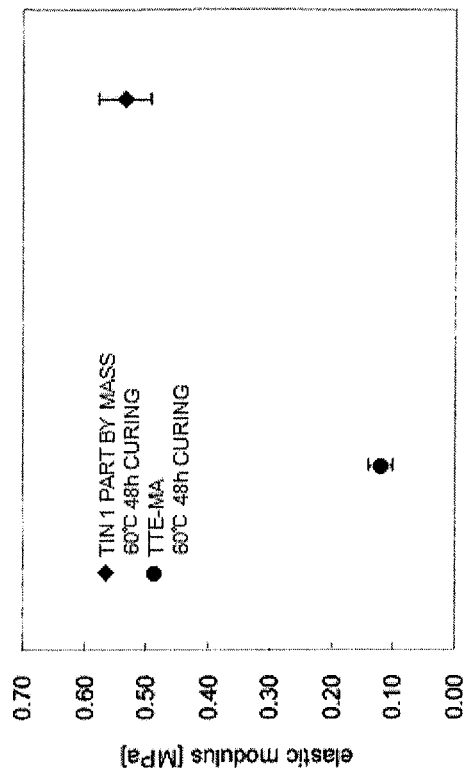
FIG. 16 shows the elastic moduli of various specimens.
Figure 17:
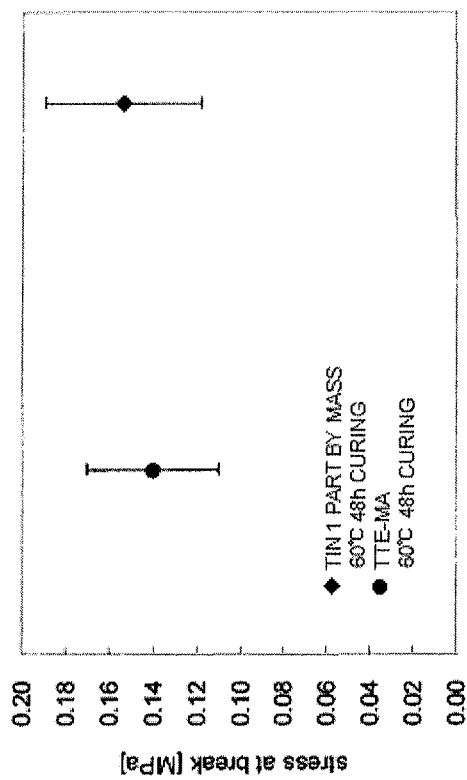
FIG. 17 shows the strengths at break of various specimens.
Figure 18:
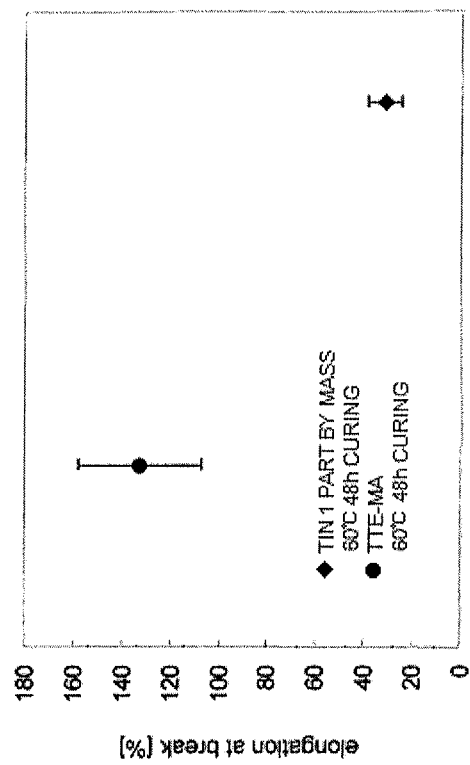
FIG. 18 shows the elongations at break of various specimens.

Table 8 and FIGS. 16 to 18 show the evaluated results of the tensile characteristics of the cured product prepared by curing the MA-based sample (MA-based sample cured product) and the Sn-1 cured product. FIG. 16 shows the elastic moduli of the specimens, FIG. 17 shows the strengths at break of the specimens, and FIG. 18 shows the elongations at break of the specimens. In these figures, the term "TTE MA 60° C. 48 h CURING" indicates the MA-based sample cured product, and the term "TIN 1 PART BY MASS 60° C. 48 h CURING" indicates the Sn-1 cured product.

As shown in Table 8 and FIGS. 16 to 18, it was found that the MA-based sample cured product showed softer and larger elongation than the Sn-based sample cured product, but they showed almost the same strength at break.

(3) Evaluation of Adhesion Performance

The MA-based sample was evaluated for its adhesion performance, using the same evaluation method as described above, which is based on FIGS. 9 to 11 shown above. The curing was carried out under the conditions of keeping the sample at 60° C. for 96 hours. As a comparison, the Sn-1 used in Experiment 1 was also evaluated under the same conditions as them used for the MA-based sample.

Figure 19:
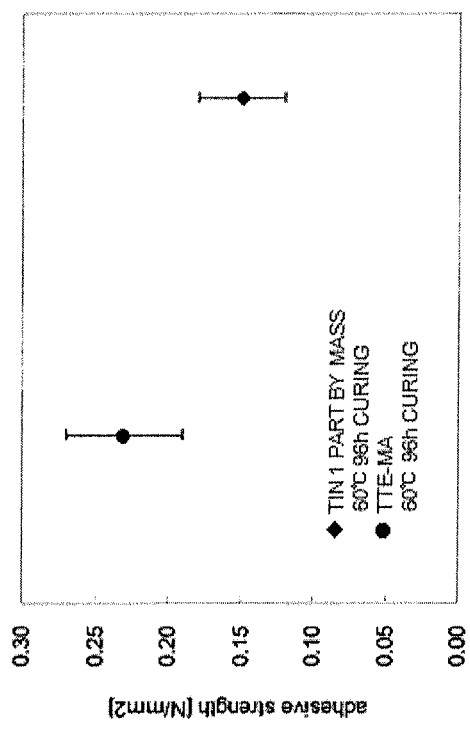
FIG. 19 shows the adhesive strengths of various specimens.

FIG. 19 shows the evaluated results of adhesive strength. In FIG. 19, the term "TTE-MA 60° C. 96 h CURING" indicates the adhesive specimen cured product prepared by curing the "MA-based sample" under the conditions of 60° C. and 96 hours. Similarly, the term "TIN 1 PART BY MASS 60° C. 96 h CURING" indicates the adhesive specimen cured product prepared by curing the "Sn-1" under the conditions of 60° C. and 96 hours.

As a result, the adhesive strength of the MA-based sample was 0.23 N/mm$^2$, and that of the Sn-1 was 0.1523 N/mm$^2$ Thus, it was found that the adhesive specimen prepared with the solution using MA showed higher adhesive strength than that prepared with the solution using the tin-based catalyst.

6. Experiment 5: Effect of Hydroxycarboxylic Acid Esters on Polymerization of PDMS (1) PDMS-TTE-MA System (Molar Ratio=1:0.05:0.05)

In a glove box through which dry nitrogen gas flowed in and out, 0.114 g of TTE (equivalent to 0.05 moles relative to 1 mole of PDMS) and 0.095 g of MA (equivalent to 0.05 moles relative to 1 mole of PDMS) were mixed in a vial with screw and a magnetic stir bar was put into the vial. After capping the vial and taking it out from the glove box, the content of the vial was stirred at 25° C. for 30 minutes. Then, the vial was moved into the glove box again filled with a dry nitrogen gas. After that, 10 g of liquid silanol-terminated polydimethylsiloxane (PDMS with Mw=1000), which had a viscosity of 34 mPa·s at 30° C., was introduced into the vial. After that, the vial was capped. The solution in the vial was stirred using a magnetic stirrer at 60° C. for 2 hours. After that, 3 g of the solution was poured into a petri dish, and the petri dish was left in an atmosphere at 25° C. and 50%±10% RH by changing the leaving period from 0 to 336 hours. Changes in molecular weight distribution and infrared spectra were evaluated by GPC and FT-IR.

As a comparison, a sample (PDMS-TTE system) was prepared with the solution mixed with 10 g of PDMS and 0.114 g of TTE without adding MA under the conditions described above. After stirring, the solution was poured into a petri dish, and the petri dish was left in an atmosphere at 25° C. and 50% RH by changing the leaving period. On the way of leaving the solution, it was also subjected to the evaluation. Furthermore, for the PDMS-TTE system, in order to examine the effects of the heating temperature and stirring period in a vial on the characteristics of the solution, other three kinds of solutions were prepared. One of them was stirred at 60° C. for 70 hours followed by the 2 hour-stirring at 60° C. described above, and the total stirring period was 72 hours. The other was stirred at 100° C. for 48 hours subsequent to the 72 hour-stirring at 60° C. The last one was stirred at 150° C. for 48 hours subsequent to the 48 hour-stirring at 100° C. In order to investigate the effect of curing temperature on the solution in a petri dish, the curing temperatures of 100° C. and 150° C. after pouring the solution into a petri dish were employed.

Figure 20:
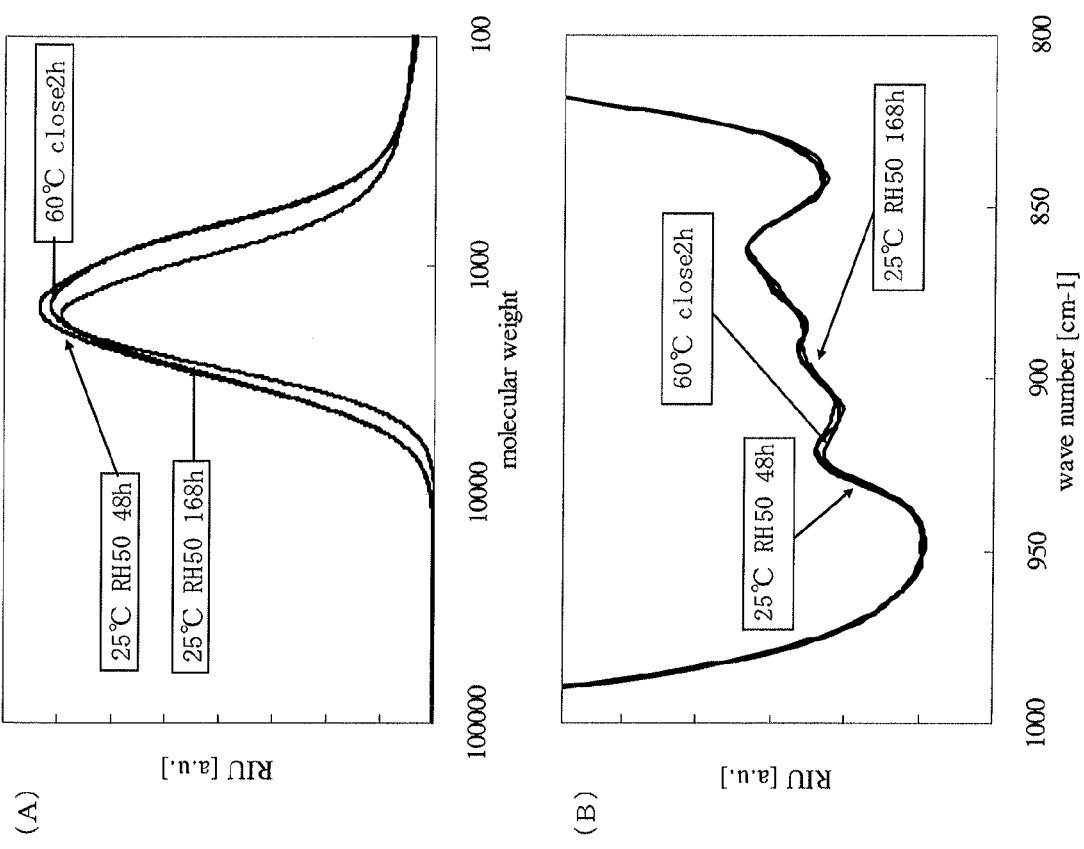
FIG. 20 shows changes in molecular weight distribution (A) and infrared spectra (B) of the solution prepared with the PDMS-TTE system used for a comparison for leaving period.

FIG. 20 shows changes in molecular weight distribution (A) and infrared spectra (B) of the solution of the PDMS-TTE system after stirring at 60° C. for 2 hours in the vial (60° C. close 2 h); a solution after pouring the stirred solution into a petri dish and leaving it at 25° C. and 50% RH for 48 hours (25° C. RH50 48 h); and a solution after pouring the stirred solution into a petri dish and leaving it at 25° C. and 50% RH for 168 hours (25° C. RH50 168 h).

Figure 21:
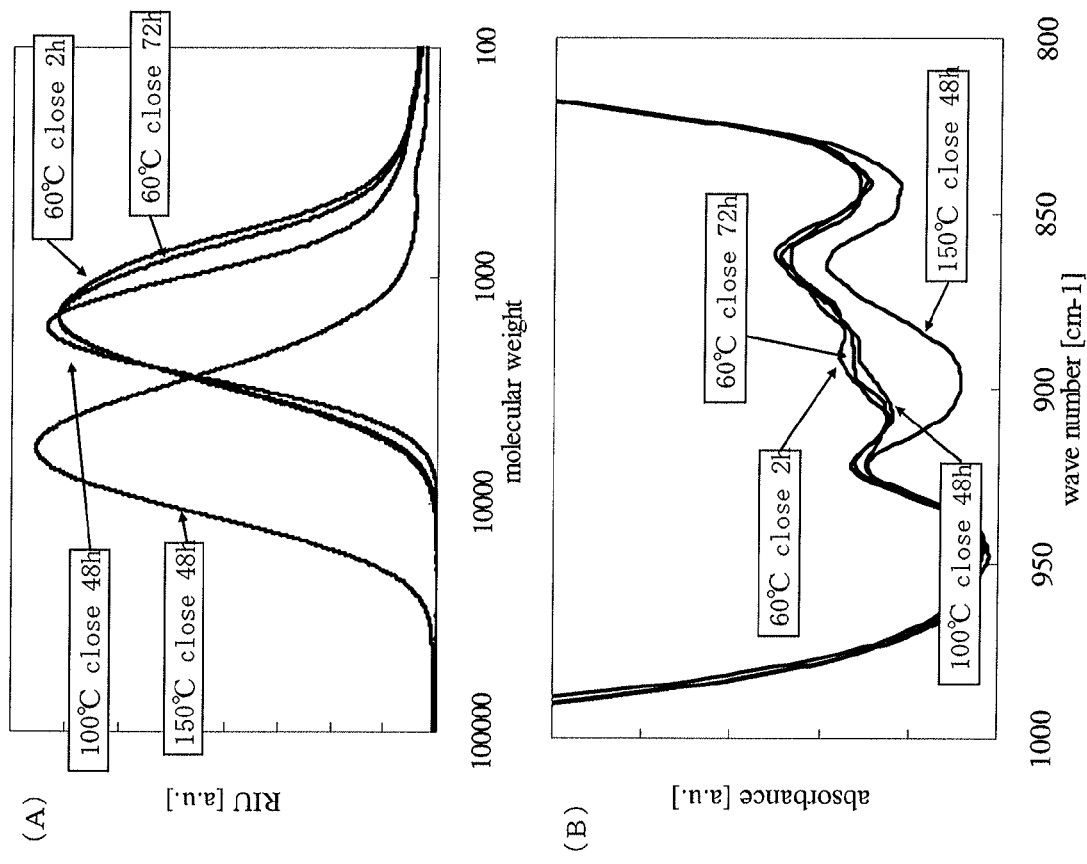
FIG. 21 shows changes in molecular weight distribution (A) and infrared spectra (B) of the solution prepared with the PDMS-TTE system used for a comparison for the conditions of stirring period and temperature.

FIG. 21 shows changes in molecular weight distribution (A) and infrared spectra (B) of the solution of the PDMS-TTE system after stirring at 60° C. for 2 hours in the vial (60° C. close 2 h); a solution after stirring at 60° C. for 72 hours in the vial (60° C. close 72 h); a solution after stirring at 100° C. for 48 hours in the vial (100° C. close 48 h); and a solution after stirring at 150° C. for 48 hours in the vial (150° C. close 48 h).

Figure 22:
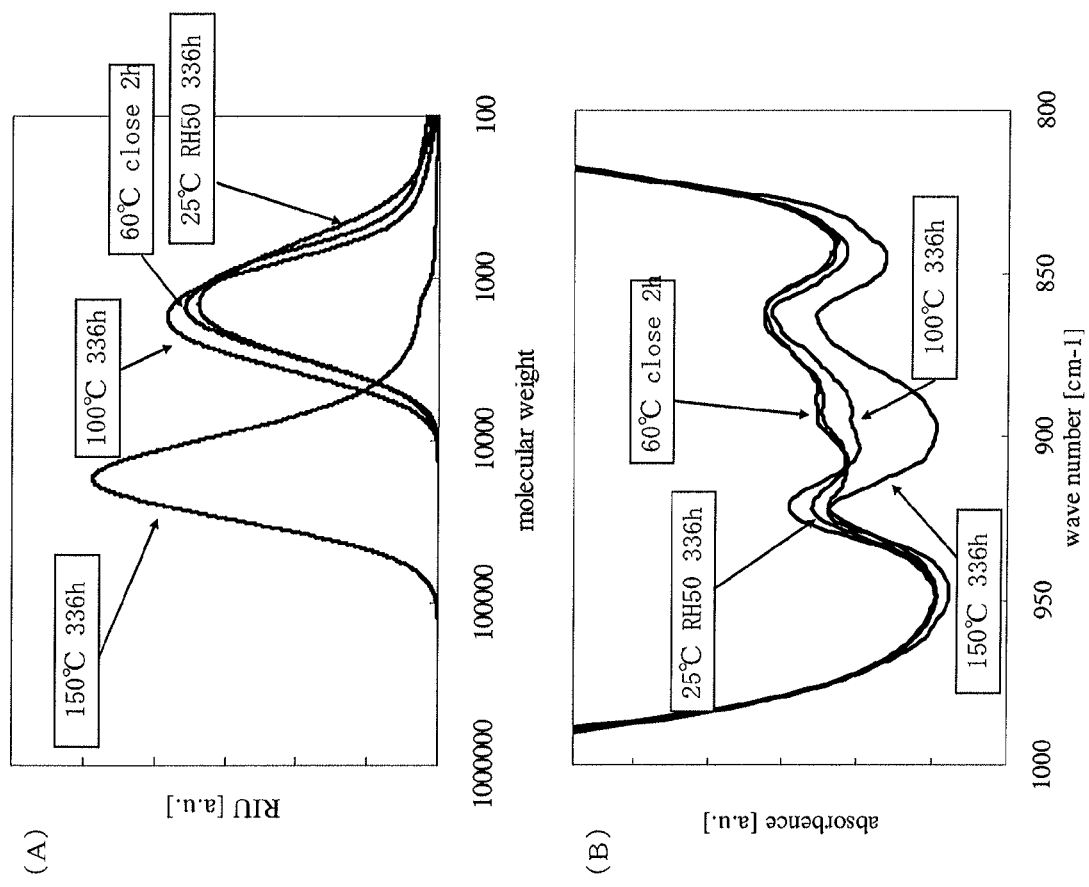
FIG. 22 shows changes in molecular weight distribution (A) and infrared spectra (B) of the solution prepared with the PDMS-TTE system used for a comparison for the conditions of leaving period and temperature.

FIG. 22 shows changes in molecular weight distribution (A) and infrared spectra (B) of the solution of the PDMS-TTE system after stirring at 60° C. for 2 hours in the vial (60° C. close 2 h); the solution after pouring the stirred solution into a petri dish and leaving the petri dish at 25° C. and 50% RH for 336 hours (25° C. RH50 336 h); the solution after pouring the stirred solution into a petri dish and leaving it at 100° C. for 336 hours (100° C. 336 h); and the solution after pouring the stirred solution into a petri dish and leaving it at 150° C. for 336 hours (150° C. 336 h).

As shown in FIG. 20, although the solutions were stirred at 60° C. for 2 hours and then left for a long time at 25° C. and 50% RH, polymerization of the solutions was not observed. Also, from the results of FT-IR spectra, the amount of the Si—OH bond was maintained almost constant. Furthermore, as shown in FIGS. 21 and 22, although the stirring period at 60° C. was extended, or the solutions were thereafter poured into petri dishes and heated to 100° C., polymerization was not observed. However, when the temperature was raised to 150° C. after stirring, polymerization was observed. Thus, it was obvious from the results of FT-IR spectra, in which the amount of the Si—OH bond decreased. Therefore, in the case of the PDMS-TTE system, it is contemplated that PDMS does not polymerize unless the solutions are heated to 150° C. or higher.

Figure 23:
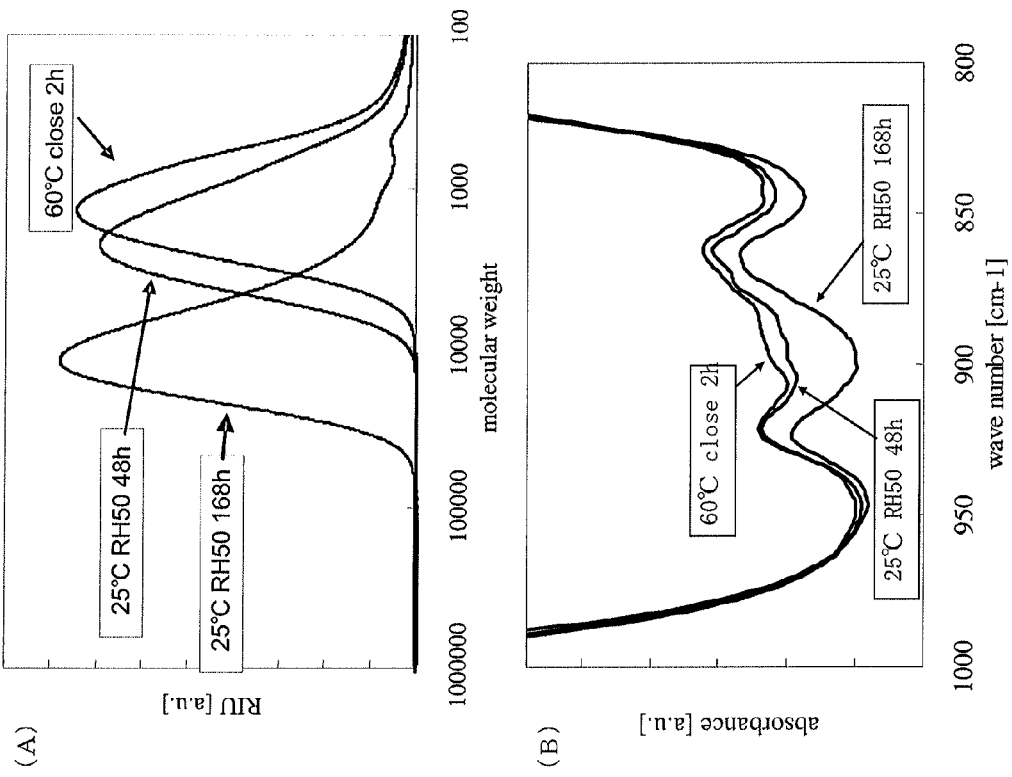
FIG. 23 shows changes in molecular weight distribution (A) and infrared spectra (B) of the solution prepared with the PDMS-TTE-MA system for leaving period.

FIG. 23 shows changes in molecular weight distribution (A) and (B) infrared spectra (B) of a solution of the PDMS-TTE-MA system after stirring at 60° C. for 2 hours in the vial (60° C. close 2 h); a solution after pouring the stirred solution into a petri dish and leaving it at 25° C. and 50% RH for 48 hours (25° C. RH50 48 h); and a solution after pouring the stirred solution into a petri dish and leaving it at 25° C. and 50% RH for 168 hours (25° C. RH50 168 h).

In the case of the PDMS-TTE-MA system, as shown in FIG. 23, after the stirred solution were poured into a petri dish, the time of leaving the stirred solution at 25° C. and 50% RH was extended to 168 hours, polymerization of the stirred solution was observed. Thus, in the case of the PDMS-TTE-MA system, since PDMS polymerizes when the solution is left for a long time at room temperature (25° C.) without heating, it is contemplated that MA functions effectively for the use as a low temperature curable type adhesive.

(2) PDMS-TTE-MADb System (Molar Ratio=1:0.05:0.05)

DL-malic acid dibutyl ester (MADb, manufactured by Tokyo Chemical Industry Co., Ltd.) was employed instead of MA in the PDMS-TTE-MA system described above. The additive amount of MADb was 0.123 g, and the molar ratio of PDMS:TTE:MADb was adjusted to 1:0.05:0.05. The leaving period conditions of stirring and leaving period after pouring the solution of the PDMS-TTE-MADb system into a petri dish, were the same as them used for the PDMS-TTE-MA system.

Figure 24:
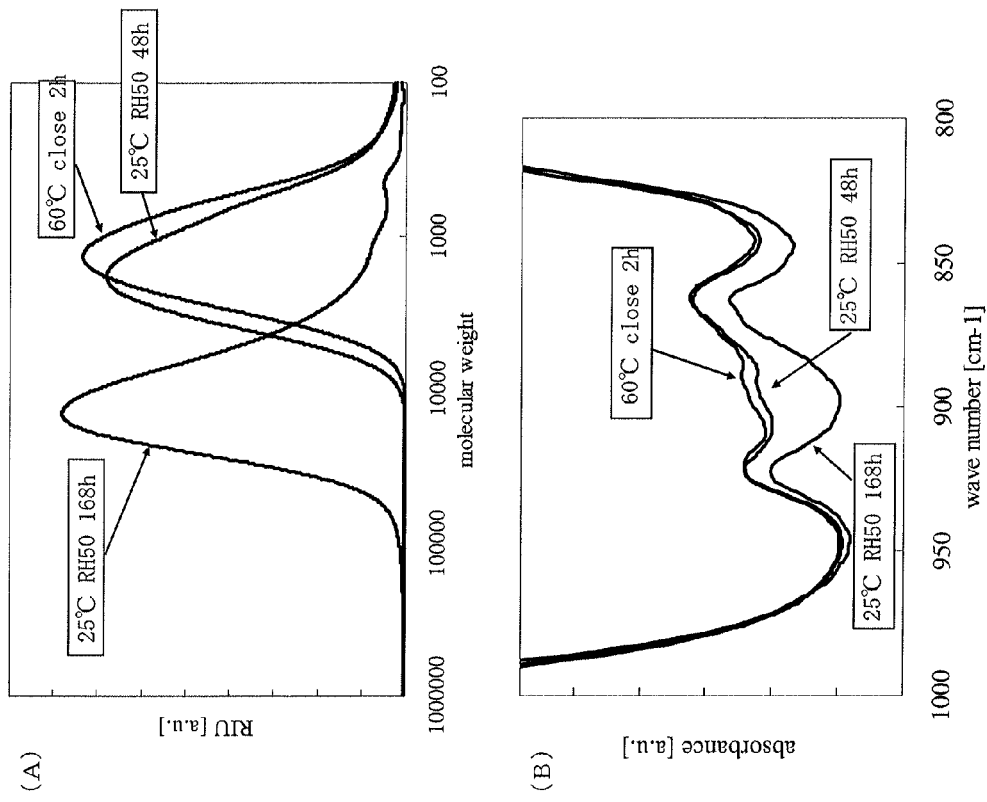
FIG. 24 shows changes in molecular weight distribution (A) and infrared spectra (B) of the solution prepared with the PDMS-TTE-MADb system for leaving period.

FIG. 24 shows changes in molecular weight distribution (A) and infrared spectra (B) of a solution of the PDMA-TTE-MADb system after stirring at 60° C. for 2 hours in the vial (60° C. close 2 h); a solution after pouring the stirred solution into a petri dish and leaving it at 25° C. and 50% RH for 48 hours (25° C. RH50 48 h); and a solution after pouring the stirred solution into a petri dish and leaving it at 25° C. and 50% RH for 168 hours (25° C. RH50 168 h).

In the case of the PDMS-TTE-MADb system, as shown in FIG. 24, almost the same results as them for the PDMS-TTE-MA system were obtained. That is, polymerization of PDMS was observed when the stirred solution was poured into a petri dish, and the period of leaving the stirred solution at 25° C. and 50% RH was 168 hours. Thus, also in the case of the PDMS-TTE-MADb system, it is contemplated that MADb functions effectively for the use as a low temperature curable type adhesive.

(3) PDMS-TTE-EL System (Molar ratio=1:0.05:0.05)

Ethyl lactate (EL, manufactured by Tokyo Chemical Industry Co., Ltd.) was employed instead of MA in the PDMS-TTE-MA system described above. The additive amount of EL was 0.059 g, and the molar ratio of PDMS:TTE:EL was adjusted to 1:0.05:0.05. The leaving period conditions of stirring and leaving period after pouring the solution of the PDMS-TTE-EL system into a petri dish, were the same as them used for the PDMS-TTE-MA system.

Figure 25:
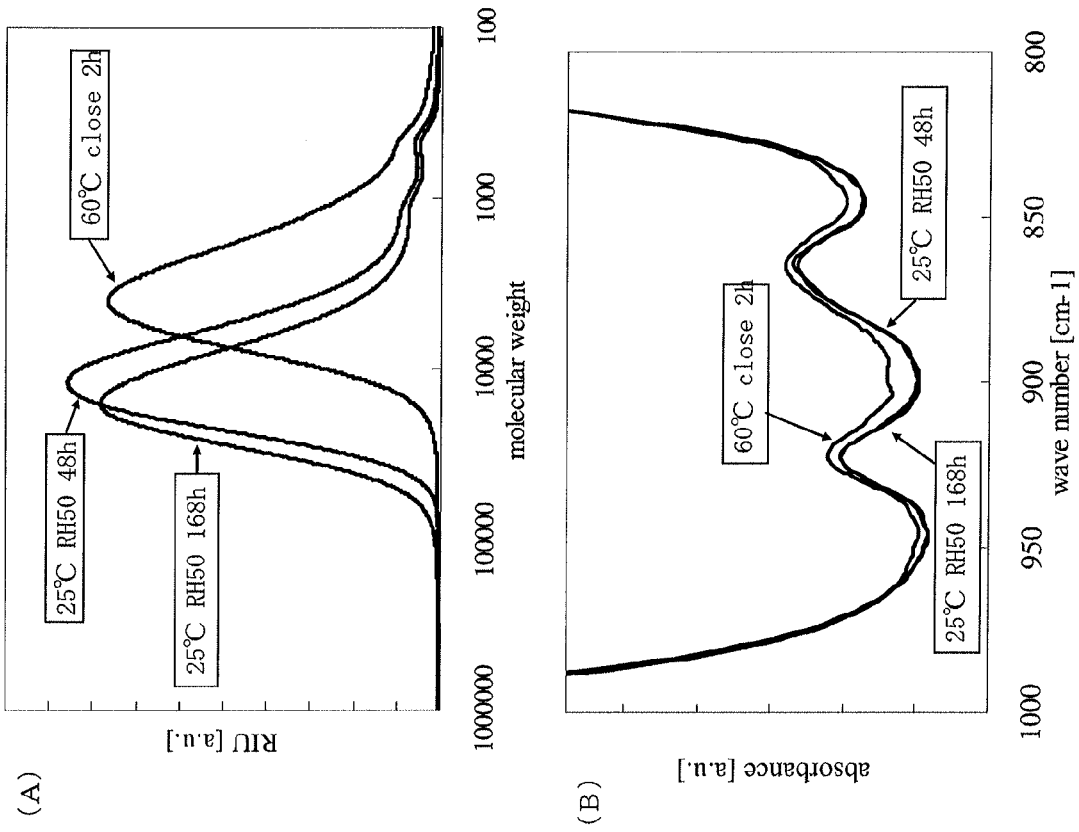
FIG. 25 shows changes in molecular weight distribution (A) and infrared spectra (B) of the solution prepared with the PDMS-TTE-EL system for leaving period.

FIG. 25 shows changes in molecular weight distribution (A) and infrared spectra (B) of a solution of the PDMS-TTE-EL system after stirring at 60° C. for 2 hours in the vial (60° C. close 2 h); a solution after pouring the stirred solution into a petri dish and leaving it at 25° C. and 50% RH for 48 hours (25° C. RH50 48 h); and a solution after pouring the stirred solution into a petri dish and leaving it at 25° C. and 50% RH for 168 hours (25° C. RH50 168 h).

In the case of the PDMS-TTE-EL system, as shown in FIG. 25, polymerization of the solution proceeded in the stage where the solution was left at 25° C. and 50% RH for 48 hours, and a large difference of molecular weight distribution between the solutions left for 48 hours and the solution left for 168 hours was not observed. From these results, it is contemplated that in the PDMS-TTE-EL system, polymerization proceeds in a shorter time at room temperature as compared with the PDMS-TTE-MA system and the PDMS-TTE-MADb system described above, and thus the addition of EL enables the PDMS-TTE-EL system to be used as a low temperature curable type adhesive.

(4) PDMS-TTE-TAdE System (Molar Ratio=1:0.05:0.05)

Ethyl tartarate (L-(+)-diethyl tartarate: TAdE, manufactured by Tokyo Chemical Industry Co., Ltd.) was employed instead of MA in the PDMS-TTE-MA system described above. The additive amount of TAdE was 0.103 g, and the molar ratio of PDMS:TTE:TAdE was adjusted to 1:0.05:0.05. The conditions for stirring and leaving period after pouring the solution of the PDMS-TAdE system into a petri dish, were the same as them used for the PDMS-TTE-MA system. In addition to them, a leaving period of 336 hours at 25° C. and 50% RH after pouring the solution into a petri dish, was also employed.

Figure 26:
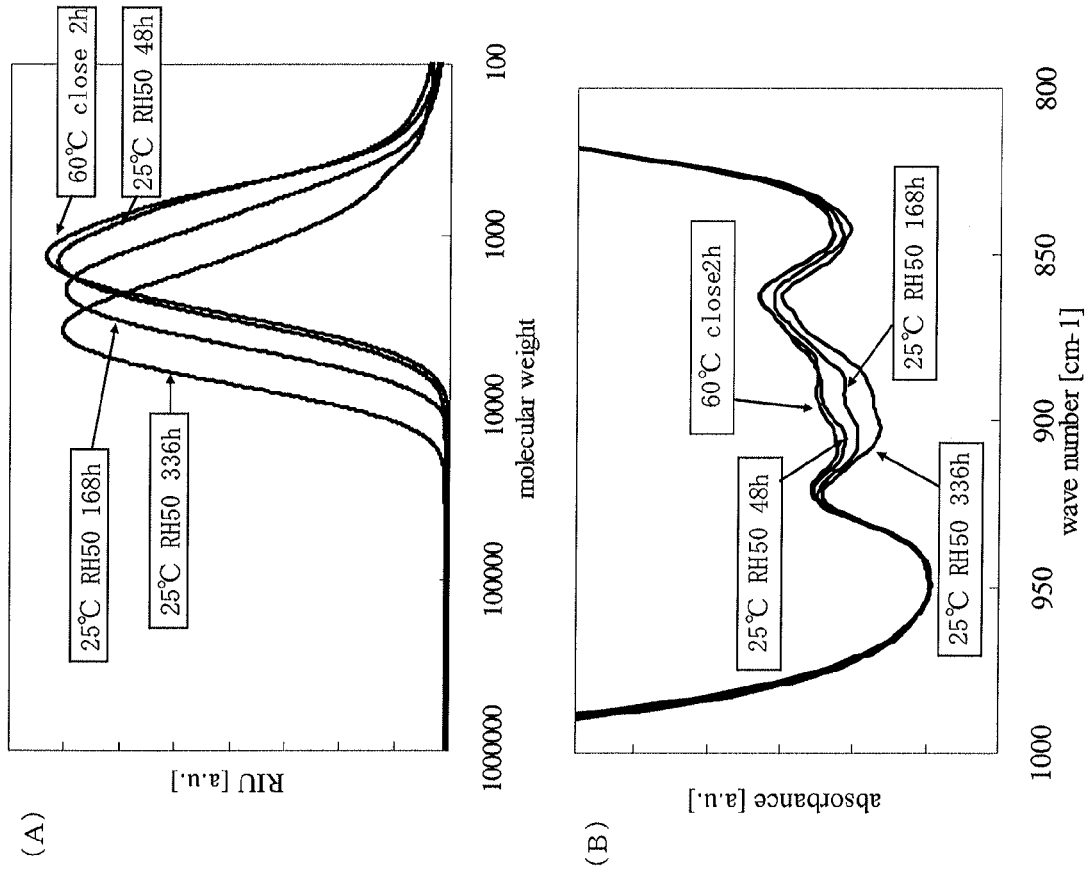
FIG. 26 shows changes in molecular weight distribution (A) and infrared spectra (B) of the solution prepared with the PDMS-TTE-TAdE system for leaving period.

FIG. 26 shows changes in molecular weight distribution (A) and infrared spectra (B) of a solution of the PDMS-TAdE system after stirring at 60° C. for 2 hours in the vial (60° C. close 2 h); a solution after pouring the stirred solution into a petri dish and leaving it at 25° C. and 50% RH for 48 hours (25° C. RH50 48 h); a solution after pouring the stirred solution into a petri dish and leaving it at 25° C. and 50% RH for 168 hours (25° C. RH50 168 h); and a solution after pouring the stirred solution into a petri dish and leaving it at 25° C. and 50% RH for 336 hours (25° C. RH50 336 h).

In the case of the PDMS-TTE-TAdE system, as shown in FIG. 26, polymerization of the stirred solution left at 25° C. and 50% RH did not show much progress till for 48 hours because the molecular weight distribution of the stirred solution was almost the same as that of the solution (60° C. close 2 h). However, as the leaving period was 168 hours and 336 hours, a slow progress of polymerization was observed. From these results, it is contemplated that the PDMS-TTE-TAdE system undergoes polymerization at room temperature but its polymerization rate was slow in contrast to the PDMS-TTE-EL system described above.

(5) PDMS-TTnB-MA System (Molar Ratio=1:0.05:0.05)

TTnB was employed instead of TTE in the PDMS-TTE-MA system described above. The additive amount of TTnB was 0.170 g, and the molar ratio of PDMS:TTnB:MA was adjusted to 1:0.05:0.05. The conditions of stirring and leaving period after pouring the solution of the PDMS-TTnB-MA system into a petri dish, were the same as them used for the PDMS-TTE-MA system.

Figure 27:
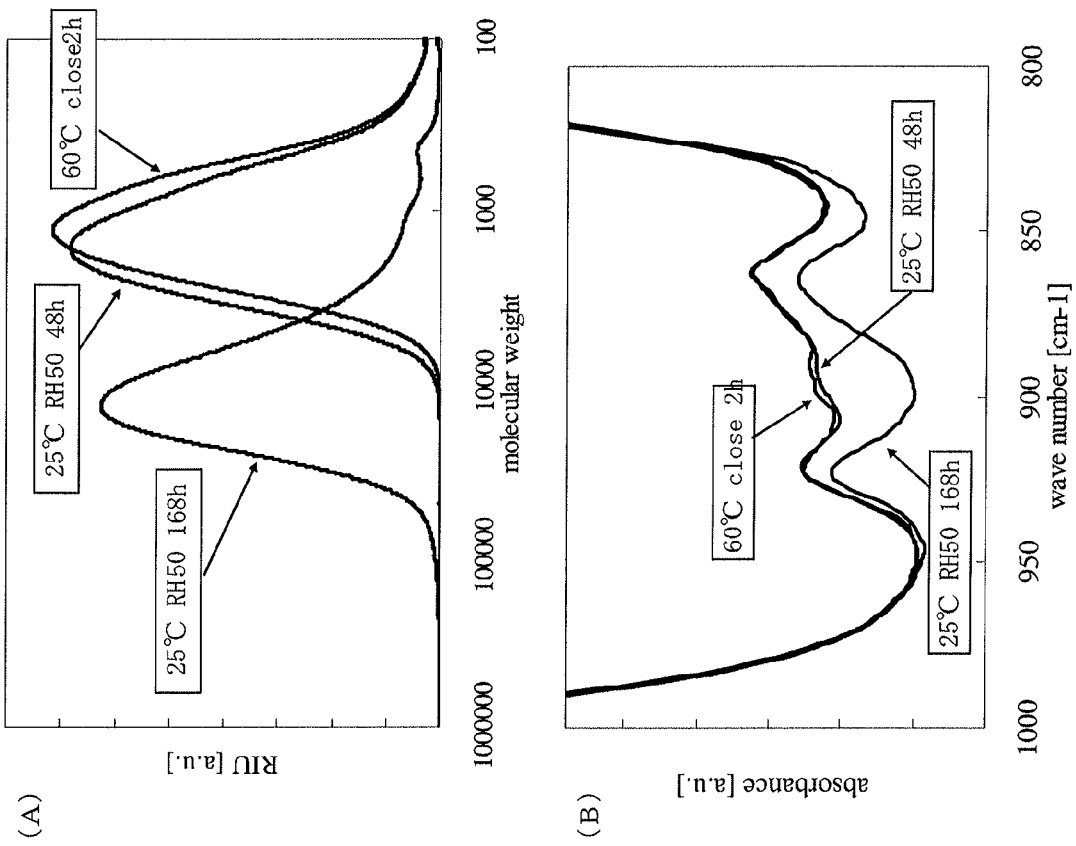
FIG. 27 shows changes in molecular weight distribution (A) and infrared spectra (B) of the solution prepared with the PDMS-TTnB-MA system for leaving period.

FIG. 27 shows changes in molecular weight distribution (A) and infrared spectra (B) of a solution of the PDMS-TTnB-MA system after stirring at 60° C. for 2 hours in the vial (60° C. close 2 h); a solution after pouring the stirred solution into a petri dish and leaving it at 25° C. and 50% RH for 48 hours (25° C. RH50 48 h); and a solution after pouring the stirred solution into a petri dish and leaving it at 25° C. and 50% RH for 168 hours (25° C. RH50 168 h).

In the case of the PDMS-TTnB-MA system, as shown in FIG. 27, when the stirred solution was poured into a petri dish, polymerization of the stirred solution at 25° C. was observed after 168 hours. This polymerization rate was close to that of the PDMS-TTE-MA system. Thus, in the case of the PDMS-TTnB-MA system, the solution underwent polymerization when it was left for a long time at room temperature (25° C.) even without heating similarly to the PDMS-TTE-MA system. Therefore, it is contemplated that MA contributes to the use as a low temperature curable type adhesive.

(6) PDMS-TTIP-MA System (Molar ratio=1:0.05:0.05)

TTIP was employed instead of TTE in the PDMS-TTE-MA system described above. The additive amount of TTIP was 0.142 g, and the molar ratio of PDMS:TTIP:MA was adjusted to 1:0.05:0.05. The conditions of stirring and leaving period after pouring the solution of the PDMS-TTIP-MA system into a petri dish, were the same as them used for the PDMS-TTE-MA system.

Figure 28:
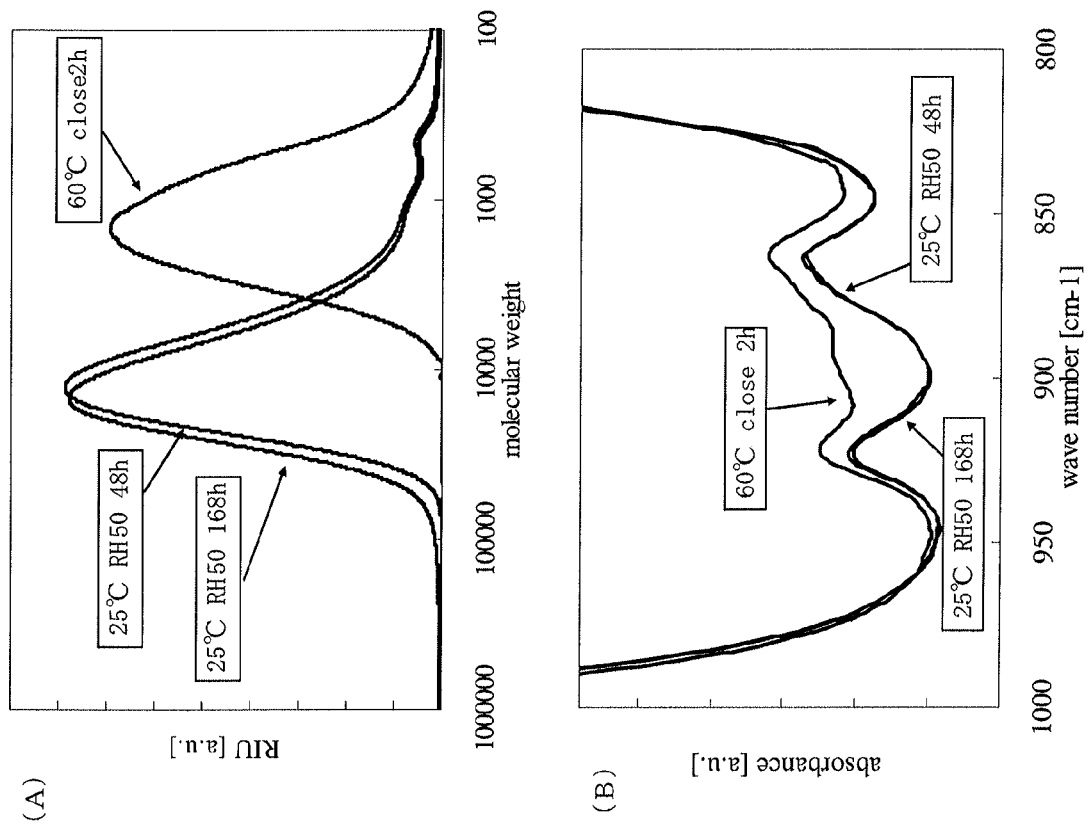
FIG. 28 shows changes in molecular weight distribution (A) and infrared spectra (B) of the solution prepared with the PDMS-TTIP-MA system for leaving period.

FIG. 28 shows changes in molecular weight distribution (A) and infrared spectra (B) of a solution of the PDMS-TTIP-MA system after stirring at 60° C. for 2 hours in the vial (60° C. close 2 h); a solution after pouring the stirred solution into a petri dish and leaving it at 25° C. and 50% RH for 48 hours (25° C. RH50 48 h); and a solution after pouring the stirred solution into a petri dish and leaving it at 25° C. and 50% RH for 168 hours (25° C. RH50 168 h).

In the case of the PDMS-TTIP-MA system, as shown in FIG. 28, polymerization of the solution left at 25° C. and 50% RH proceeded after 48 hours. There was not a large difference of molecular weight distribution between the solution at 48 hours and the solution at 168 hours was not observed. From these results, it is contemplated that in the PDMS-TTIP-MA system, polymerization of the solution proceeds in a shorter time at room temperature as compared with the PDMS-TTE-MA system and the PDMS-TTnB-MA system described above. Thus, the PDMS-TTIP-MA system contributes to the use as a low temperature curable type adhesive.

Industrial Applicability

The polyorganosiloxane composition of the present invention can be used, for example, as a silicone adhesive that can be cured at low temperature.

The invention claimed is:

1. A polyorganosiloxane composition comprising:
   (A) a polyorganosiloxane having at least one end in the molecule modified with a silanol;
   (B) a titanium alkoxide in an amount of 0.01 to 2 moles relative to 1 mole of the polyorganosiloxane; and
   (C) an α-hydroxycarbonyl compound in an amount of 0.01 to 2 moles, or a hydroxycarboxylic acid ester in an amount of 0.01 to 2 moles, relative to 1 mole of the polyorganosiloxane.

2. The polyorganosiloxane composition according to claim 1, wherein the hydroxycarboxylic acid ester in an amount of 0.01 to 2 moles is particularly a malic acid ester in an amount of 0.01 to 0.4 moles.

3. The polyorganosiloxane composition according to claim 1, wherein the hydroxycarboxylic acid ester is a malic acid ester, a lactic acid ester, or a tartaric acid ester.

4. The polyorganosiloxane composition according to claim 1, wherein the α-hydroxycarbonyl compound is hydroxyacetone.

5. The polyorganosiloxane composition according to claim 1, wherein the titanium alkoxide is titanium tetraethoxide, titanium tetraisopropoxide, or titanium tetrabutoxide.

6. The polyorganosiloxane composition according to claim 1, comprising the polyorganosiloxane, the titanium alkoxide, and the hydroxyacetone at a molar ratio of 1:1:0.5, the polyorganosiloxane composition having a weight average molecular weight (Mw) of 8000 or more.

7. The polyorganosiloxane composition according to claim 6, wherein the titanium alkoxide is titanium tetraethoxide, titanium tetraisopropoxide, or titanium tetrabutoxide.

8. The polyorganosiloxane composition according to claim 1, comprising the polyorganosiloxane, the titanium alkoxide, and the hydroxycarboxylic acid ester at a molar ratio of 1:1:0.1, the polyorganosiloxane composition having a weight average molecular weight (Mw) of 5000 or more.

9. The polyorganosiloxane composition according to claim 8, wherein the titanium alkoxide is titanium tetraethoxide.

10. The polyorganosiloxane composition according to claim 1, comprising the polyorganosiloxane, the titanium alkoxide, and the hydroxycarboxylic acid ester at a molar ratio of 1:0.05:0.05.

11. The polyorganosiloxane composition according to claim 10, wherein the hydroxycarboxylic acid ester is a malic acid ester, a lactic acid ester, or a tartaric acid ester.

12. A polyorganosiloxane composition cured product, obtained by curing the polyorganosiloxane composition according to claim 1.

13. A polyorganosiloxane composition cured product, obtained by curing the polyorganosiloxane composition according to claim 2.

14. A polyorganosiloxane composition cured product, obtained by curing the polyorganosiloxane composition according to claim 3.

15. A polyorganosiloxane composition cured product, obtained by curing the polyorganosiloxane composition according to claim 4.

16. A polyorganosiloxane composition cured product, obtained by curing the polyorganosiloxane composition according to claim 5.

17. A polyorganosiloxane composition cured product, obtained by curing the polyorganosiloxane composition according to claim 6.

18. A polyorganosiloxane composition cured product, obtained by curing the polyorganosiloxane composition according to claim 8.

19. A polyorganosiloxane composition cured product, obtained by curing the polyorganosiloxane composition according to claim 10.

* * * * *